(12) United States Patent
Yoon

(10) Patent No.: US 10,852,235 B2
(45) Date of Patent: Dec. 1, 2020

(54) ULTRALOW RANGE FLUOROMETER CALIBRATION

(71) Applicant: Ecolab USA Inc., Saint Paul, MN (US)

(72) Inventor: Seong-Hoon Yoon, Naperville, IL (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 16/290,523

(22) Filed: Mar. 1, 2019

(65) Prior Publication Data

US 2019/0271646 A1 Sep. 5, 2019

Related U.S. Application Data

(60) Provisional application No. 62/637,550, filed on Mar. 2, 2018.

(51) Int. Cl.
*G01N 21/64* (2006.01)
*C02F 1/44* (2006.01)
(Continued)

(52) U.S. Cl.
CPC ........... *G01N 21/643* (2013.01); *C02F 1/008* (2013.01); *C02F 1/441* (2013.01); *G01M 3/207* (2013.01);
(Continued)

(58) Field of Classification Search
CPC .... G01N 21/643; G01N 21/274; G01N 21/64; G01N 21/645; G01N 21/85;
(Continued)

(56) References Cited

U.S. PATENT DOCUMENTS 4,992,380 A * 2/1991 Moriarty ............ G01N 33/1893
436/55
5,462,879 A 10/1995 Bentsen
(Continued)

FOREIGN PATENT DOCUMENTS

EP 2322913 A2 5/2011
GB 822848 A 11/1959

OTHER PUBLICATIONS

Dr. D. Stone; "Calibration and Linear Regression Analysis: A Self-Guided Tutorial", Part 2—The Calibration Curve, Correlation and Confidence Limits, Description of course CHM314—Instrument Analysis, Department of Chemistry, University of Toronto, publication date estimated. (Year: 2014).*

(Continued)

*Primary Examiner* — Joseph W Drodge
(74) *Attorney, Agent, or Firm* — Fredrikson & Byron, P.A.

(57) ABSTRACT

A fluorometer may be used to measure ultralow concentrations of fluorescing species, such as ultralow concentrations of fluorescent tracer passing through a reverse osmosis membrane into a permeate stream. In some examples, the fluorometer may be recalibrated by resetting some but not all of the calibration parameters used to determine the concentration of fluorescent tracer in the permeate based on the measured fluorescent response of the fluorometer. For example, an intercept of a calibration curve may be reset or recalibrated for the fluorometer in situ, potentially providing significant accuracy improvements even though the fluorometer has not undergone a full recalibration.

27 Claims, 8 Drawing Sheets

(51) Int. Cl.
*C02F 1/00* (2006.01)
*G01M 3/20* (2006.01)
*G01N 21/27* (2006.01)
*B01D 61/02* (2006.01)
*G01N 21/85* (2006.01)
*G01N 21/84* (2006.01)

(52) U.S. Cl.
CPC .......... *G01N 21/274* (2013.01); *G01N 21/64* (2013.01); *G01N 21/645* (2013.01); *B01D 61/025* (2013.01); *B01D 2311/12* (2013.01); *C02F 2209/003* (2013.01); *G01N 21/85* (2013.01); *G01N 2021/6439* (2013.01); *G01N 2021/8411* (2013.01); *G01N 2201/12715* (2013.01); *G01N 2201/12753* (2013.01)

(58) Field of Classification Search
CPC . G01N 2201/12715; G01N 2021/8411; G01N 2201/12753; G01N 2021/6439; G01N 21/278; G01N 2201/8411; G01N 2021/6495; G01N 2021/6497; G01N 2223/0766; G01M 3/207; G01M 3/20; C02F 1/441; C02F 1/008; C02F 2209/003; B01D 2311/12; B01D 61/025; B01D 61/12; B01D 61/22; B01D 2311/06; B01D 2311/246
USPC ............ 210/94, 652, 745; 422/82.07, 82.08; 436/172
See application file for complete search history.

(56) References Cited

U.S. PATENT DOCUMENTS

| | | | |
|---|---|---|---|
| 5,489,977 A * | 2/1996 | Winslow | G01N 21/53 356/339 |
| 6,360,582 B1 | 3/2002 | Chelvayohan et al. | |
| 6,730,227 B2 | 5/2004 | Zeiher et al. | |
| 6,821,428 B1 | 11/2004 | Zeiher et al. | |
| 6,838,001 B2 | 1/2005 | Zeiher et al. | |
| 6,838,002 B2 | 1/2005 | Zeiher et al. | |
| 6,999,173 B2 | 2/2006 | Kleinfeld et al. | |
| 8,076,154 B2 | 12/2011 | Erickson et al. | |
| 10,317,385 B2 | 6/2019 | Li et al. | |
| 2003/0049175 A1* | 3/2003 | Buechler | G01N 21/645 422/82.08 |
| 2004/0104169 A1 | 6/2004 | Zeiher et al. | |
| 2004/0104171 A1 | 6/2004 | Zeiher et al. | |
| 2004/0115757 A1 | 6/2004 | Ho et al. | |
| 2004/0185472 A1 | 9/2004 | Kelle Zeiher et al. | |
| 2006/0160226 A1 | 7/2006 | Johnson | |
| 2006/0160227 A1* | 7/2006 | Sethumadhavan | C02F 1/5209 436/56 |
| 2007/0084721 A1 | 4/2007 | Hsung et al. | |
| 2009/0220940 A1* | 9/2009 | Lev | B01D 65/102 435/5 |
| 2010/0107723 A1 | 5/2010 | Hajishah et al. | |
| 2012/0015445 A1 | 1/2012 | Kellner et al. | |
| 2014/0183140 A1* | 7/2014 | Atkins | C02F 5/12 210/701 |
| 2015/0001139 A1* | 1/2015 | Cohen | B01D 61/10 210/85 |
| 2016/0122201 A1* | 5/2016 | Gilmore | G01N 33/1826 700/271 |
| 2016/0123882 A1 | 5/2016 | Gilmore et al. | |
| 2016/0131512 A1* | 5/2016 | Shirai | G01F 1/69 702/47 |
| 2016/0160227 A1* | 6/2016 | Kondo | C12N 15/8261 800/281 |
| 2016/0258811 A1* | 9/2016 | Kustermans | A61L 2/10 |
| 2017/0003261 A1* | 1/2017 | Li | G01N 21/6428 |
| 2017/0021309 A1* | 1/2017 | Yoon | C02F 1/008 |
| 2017/0234793 A1 | 8/2017 | Gilmore | |

OTHER PUBLICATIONS

International Patent Application No. PCT/US2019/020346, International Search Report and Written Opinion dated May 16, 2019, 17 pages.
Frenkel et al., "New techniques for real-time monitoring of membrane integrity for virus removal," WateReuse Research Foundation, 2014, 104 pages.
Lozier et al., "Microbial Removal and Integrity Monitoring of High-Pressure Membranes," Awwa Research Foundation, 2003, 220 pages.
Marra et al., "An Evaluation of an In situ Fluorometer for the Estimation of Chlorophyll a," Lamont-Doherty Earth Observatory of Columbia University, Technical Report, LDEO-93-1, May 1993, 41 pages.
Pype et al., "National Validation Guidelines for Water Recycling: Reverse Osmosis Membranes," Australian Water Recycling Centre of Excellence, The University of Queensland, Sep. 2015, 143 pages.
Surawanvijit et al., "Pulsed marker method for real-time detection of reverse osmosis membrane integrity loss," Desalination, vol. 370, 2015, pp. 25-32.

* cited by examiner

ULTRALOW RANGE FLUOROMETER CALIBRATION

RELATED MATTERS

This application claims priority to U.S. Provisional Patent Application No. 62/637,550, filed Mar. 2, 2018, the entire contents of which are incorporated herein by reference.

TECHNICAL FIELD

This disclosure relates to the calibration of fluorometers and, more particularly, to the calibration of fluorometers used to monitor low concentrations of fluorophores in membrane separation processes.

BACKGROUND

Membrane separation is a technology that selectively separates materials via pores and/or minute gaps in the molecular arrangement of a continuous membrane structure. Membrane separations can be classified by pore size and by the separation driving force. Example membrane separation techniques include microfiltration (MF), ultrafiltration (UF), ion-exchange (IE), and reverse osmosis (RO). For example, reverse osmosis is widely used in water purification processes to remove ions, bacteria, and other molecules and larger particles from the water. In a reverse osmosis process, an applied pressure is used to overcome an osmotic pressure across the membrane, allowing substantially pure solvent (e.g., water) to pass through the membrane while a residual solute is retained on the pressurized side of the membrane.

In practice, the degree of purification achieved using the membrane separation process is dictated, at least in part, by the quality and integrity of the membrane used in the process. If there are chemical and/or mechanical failures to the membrane structure, impurities can pass through the membrane breach and into the resulting "purified" product stream. In the case of water purification, harmful impurities and pathogens (e.g., waterborne enteric viruses, *Cryptosporidium, Giardia* cysts, nanoparticles, organic compounds, and so forth), which can be in the nanosize range, can pass through the membrane breach into the clean water stream, potentially creating health risks.

For these and other reasons, techniques have been used to monitor the performance of membrane separation processes. As one example, a fluorometric monitoring process may be used to monitor the performance of a membrane separation process by introducing a fluorescent tracer into a feed stream and then detecting the fluorescent tracer in one or more streams downstream of the separation membrane. The extent to which the fluorescent tracer passes through the membrane can provide an indication of the integrity of the membrane.

Practical challenges arise when attempting to fluorometrically monitor the performance of a membrane separation process. Since a properly-functioning membrane may separate most of the fluorescent tracer from the purified product stream (also referred to as the permeate), the fluorometer may need to detect very small concentrations of tracer. Small changes in the calibration or measurement accuracy of the fluorometer may cause large errors in the measured tracer concentration at these very small concentrations. Moreover, since many membrane separation processes operate continuously, for example supplying critical water needs, there may be little or no opportunity to recalibrate the fluorometer.

SUMMARY

In general, this disclosure is directed to systems and techniques for calibrating fluorometers, including systems and techniques for monitoring and/or controlling membrane separation processes utilizing such fluorometers. In some examples, the techniques include partial recalibration of a fluorometer in-situ based on control of a fluorescent tracer introduced into a feed stream being separated using a membrane separation process. Prior to or concurrent with startup of a membrane separation process, a fluorometer used to monitor the process may undergo a full, multi-point calibration. The full calibration process may involve fluorometrically analyzing a reference solution that is a blank or zero fluorescence solution in addition to one or more other reference solutions having known concentrations of fluorescent tracer. A single or higher order calibration curve having a slope and an intercept relating the measured fluorometric response of the fluorometer to a fluorescent tracer concentration can then be stored in a computer readable memory associated with the fluorometer.

In subsequent operation, the fluorescent tracer can be introduced into a feed stream before a membrane used in a membrane separation process. The fluorometer can monitor the feed stream and/or one or more streams downstream of the membrane, such as a permeate stream. With reference to the calibration information generated during the full calibration, the concentration of fluorescent tracer in the monitored stream can be monitored based on the fluorescent response of the stream by the fluorometer. Over time, however, the fluorometer may lose calibration. The fluorometer may lose calibration for a variety of reasons, such as fouling buildup, changing electrical resistance of a circuit, changing light source strength, and/or other factors. Accordingly, the accuracy of measurements made by the fluorometer may deteriorate over time.

In accordance with some examples of the present disclosure, a zero point recalibration is performed on the fluorometer without performing a full, multipoint recalibration. When performing the zero point recalibration, the intercept of the calibration curve stored for the fluorometer may be reset, e.g., without changing other parameters defining the calibration curve. It has been found that, in some applications, recalibrating the intercept of the recalibration curve of the fluorometer, particularly when detecting very low concentrations of fluorescent tracer, can provide highly beneficial accuracy improvements even though a full recalibration is not performed. As described in greater detail below, such a partial recalibration may be performed without removing the fluorometer from its operating environment, allowing the accuracy of the fluorometer to be enhanced even though a full recalibration may not be feasible.

Without wishing to be bound by any particular theory, it is believed that, in some applications, zero point drift is a more significant contributor to measurement inaccuracies than other calibration inaccuracies. For example, for fluorometers used to measure ultralow concentrations of fluorescent tracer, such as in membrane separation permeate streams, small shifts in zero point calibration have been found to cause large inaccuracies in measured tracer concentration. For instance, a shift in the zero point of the calibration curve may cause a measurement inaccuracy equivalent to 0.01 µg/L or greater. If measuring higher concentrations of fluorescent tracer, such as 1-1,000 µg/L, the measurement inaccuracy is 1% or less. However, when measuring ultralow concentrations of fluorescent tracer, such as 0.1 µg/L or less, that same measurement inaccuracy causes a measurement error of 10% or greater.

In some examples, a fluorometer zero point recalibration process can be performed by controlling a fluorescent tracer introduced into a feed stream that is undergoing membrane separation. Typically, the fluorescent tracer will be introduced into the feed stream at a substantially constant rate and/or in an amount effective to achieve a substantially constant concentration. During zero point recalibration, the concentration of the fluorescent tracer may be adjusted to provide a fluorescent signal change that can be used to recalibrate the intercept of the calibration curve for the fluorometer. In different examples, introduction of the fluorescent tracer into the feed stream may be stopped, or increased or decreased relative to a baseline introduction rate. The fluorescent signal measured by the fluorometer can be used to adjust the intercept of the calibration curve, allowing one or more adjusted calibration curve parameters to be stored in a memory associated with the fluorometer for subject use.

In one example, a method of calibrating a fluorometer used to monitor a reverse osmosis membrane separation process is described. The method includes introducing a fluorescent tracer into a feed stream to provide a first concentration of fluorescent tracer in the feed stream and contacting a reverse osmosis membrane with the feed stream, thereby generating a permeate stream and a concentrate stream. The method also includes fluorometrically analyzing the permeate stream generated from the feed stream having the first concentration of fluorescent tracer with a fluorometer and determining therefrom a first measured concentration of the fluorescent tracer in the permeate stream based on a stored calibration curve that includes an intercept. The method further includes adjusting a concentration of the fluorescent tracer introduced into the feed stream to provide a second concentration of fluorescent tracer in the feed stream different than the first concentration. Further, the example method includes fluorometrically analyzing the permeate stream generated from the feed stream having the second concentration of fluorescent tracer with the fluorometer and determining therefrom a second measured concentration of the fluorescent tracer in the permeate stream based on the calibration curve. In addition, the method includes determining an intercept shift for the calibration curve based on comparison of the first measured concentration to the second measured concentration and determining an adjusted intercept for the calibration curve based on the intercept shift.

In another example, a system is described that includes a fluorescent tracer pump configured to introduce fluorescent tracer into a feed stream, a membrane configured to separate the feed stream into a permeate stream and a concentrate stream, a fluorometer configured to fluorometrically analyze the permeate stream, and a controller communicatively coupled to the fluorescent tracer pump and the fluorometer. The example specifies that the controller is configured to control the fluorescent tracer pump to introduce the fluorescent tracer into a feed stream to provide a first concentration of fluorescent tracer in the feed stream. In addition, the controller is configured to control the fluorometer to fluorometrically analyze the permeate stream generated from the feed stream having the first concentration of fluorescent tracer and determine therefrom a first measured concentration of the fluorescent tracer in the permeate stream based on a stored calibration curve that includes an intercept. In addition, the example specifies that the controller is configured to control the fluorescent tracer pump to adjust a concentration of the fluorescent tracer introduced into the feed stream to provide a second concentration of fluorescent tracer in the feed stream different than the first concentration. In addition, the controller is configured to control the fluorometer to fluorometrically analyze the permeate stream generated from the feed stream having the second concentration of fluorescent tracer and determine therefrom a second measured concentration of the fluorescent tracer in the permeate stream based on the calibration curve. The example further states that the controller is configured to determine an intercept shift for the calibration curve based on comparison of the first measured concentration to the second measured concentration and determine an adjusted intercept for the calibration curve based on the intercept shift.

In another example, a method of calibrating a fluorometer used to monitor a reverse osmosis membrane separation process is described. The method includes introducing a fluorescent tracer into a feed stream and contacting a reverse osmosis membrane with the feed stream, thereby generating a permeate stream and a concentrate stream. The method further involves terminating the introduction of fluorescent tracer introduced into the feed stream and fluorometrically analyzing the permeate stream generated from the feed stream following termination of the fluorescent tracer and determining therefrom a measured concentration of the fluorescent tracer in the permeate stream based on a stored calibration curve that includes an intercept. The method further includes determining an adjusted intercept for the calibration curve of the fluorometer by at least using the measured concentration of the fluorescent tracer as an intercept shift.

In another example, a system is described that includes a fluorescent tracer pump configured to introduce fluorescent tracer into a feed stream, a reverse osmosis membrane configured to separate the feed stream into a permeate stream and a concentrate stream, a fluorometer configured to fluorometrically analyze the permeate stream, and a controller communicatively coupled to the fluorescent tracer pump and the fluorometer. The example specifies that the controller is configured to control the fluorescent tracer pump to introduce a fluorescent tracer into the feed stream and subsequently control the fluorescent tracer pump to terminate the introduction of fluorescent tracer introduced into the feed stream. The controller is also configured to control the fluorometer to fluorometrically analyze the permeate stream generated from the feed stream following termination of the fluorescent tracer and determine therefrom a measured concentration of the fluorescent tracer in the permeate stream based on a stored calibration curve that includes an intercept. In addition, the example states that the controller is configured to determine an adjusted intercept for the calibration curve of the fluorometer by at least using the measured concentration of the fluorescent tracer as an intercept shift.

In another example, a method for calibrating a fluorometer is described. The method includes performing a multi-point calibration with a fluorometer, the multi-point calibration comprising fluorometrically analyzing a first fluid substantially devoid of a fluorescent tracer and a second fluid having a known concentration of the fluorescent tracer and determining therefrom a calibration curve for the fluorometer that includes a slope and an intercept. The method includes subsequent to performing the multi-point calibration, fluorometrically analyzing, with the fluorometer, an aqueous stream in which the fluorescent tracer is introduced at a first concentration level and determining a measured concentration of the fluorescent tracer in the aqueous stream based on the calibration curve. The method further includes adjusting the concentration of fluorescent tracer introduced into the aqueous stream by one of terminating an addition of the fluorescent tracer to the aqueous stream, increasing an amount of the fluorescent tracer added to the aqueous stream, or decreasing the amount of the fluorescent tracer added to the aqueous stream. In addition, the method involves fluorometrically analyzing, with the fluorometer, the aqueous stream following adjustment of the concentration of fluorescent tracer and determining an intercept shift for the calibration curve based on fluorometric analysis of the aqueous stream following adjustment of the concentration of fluorescent tracer without determining an adjusted slope for the calibration curve. The method also includes storing an adjusted intercept for the calibration curve compensating for the intercept shift in a non-transitory memory associated with the fluorometer.

The details of one or more examples are set forth in the accompanying drawings and the description below. Other features, objects, and advantages will be apparent from the description and drawings, and from the claims.

DETAILED DESCRIPTION

In general, this disclosure describes systems and techniques for calibrating fluorometric sensors as well as membrane separation systems and processes utilizing such fluorometric sensors. In some examples, a multi-point calibration is performed with the fluorometer prior to use in the membrane separation process. The multipoint calibration process may involve fluorometrically analyzing a first fluid substantially or entirely devoid of a fluorescent tracer, a second fluid having a known concentration of the fluorescent tracer, and optionally one or more additional fluids having known concentrations of the fluorescent tracer different than the second fluid. A calibration curve for the fluorometer can be determined from the fluorometric analysis of the different fluids. The calibration curve may be in the form of a single or higher order equation having a slope and an intercept.

In subsequent use, the fluorometer can be used to fluorometrically analyze an aqueous stream in which the fluorescent tracer for which the fluorometer was previously calibrated is introduced. For example, the fluorometer may analyze a permeate stream passing through a membrane filter in a reverse osmosis process in which the fluorescent tracer is introduced into the corresponding feed stream. The fluorescent tracer may be introduced at a first concentration level and a measured concentration of the fluorescent tracer in the aqueous stream being monitored determined based on the calibration curve.

To recalibrate the fluorometer, the concentration of fluorescent tracer introduced into the aqueous stream may be adjusted. For example, introduction of the fluorescent tracer may be decreased up to and including being terminated (or, in other cases, may not be terminated) or increased relative to the first concentration level. The fluorometer can then fluorometrically analyze the aqueous stream following adjustment of the concentration of fluorescent tracer. Based on the fluorometric response measured, an intercept shift for the calibration curve can be determined, e.g., without determining an adjusted slope for the calibration curve. This intercept shift can be used to determine an adjusted intercept for the calibration curve that is then stored for subsequent use.

Figure 1:
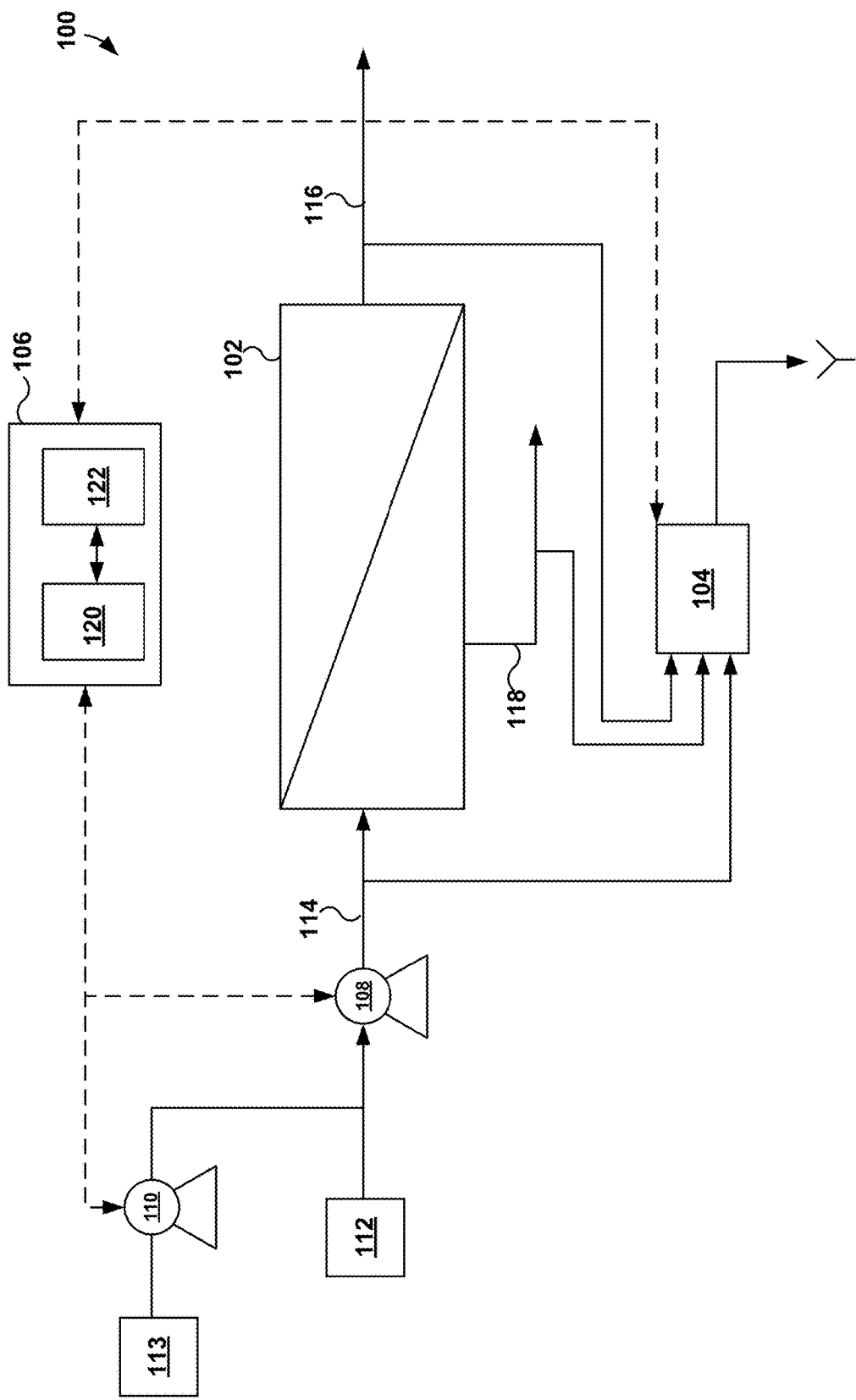
FIG. 1 is a diagram illustrating an example membrane separation system that includes a fluorometer that may be calibrated according to the disclosure.

FIG. 1 is a conceptual diagram illustrating an example membrane separation system 100 that can utilize one or more fluorometers that may be calibrated as described herein. System 100 includes a separation membrane 102, at least one fluorometer 104, and a controller 106. System 100 in FIG. 1 is also illustrated as including a feed stream pressurization pump 108 and a fluorescent tracer pump 110. Feed stream pressurization pump 108 is in fluid communication with a source 112 of fluid to be purified using membrane 102. Fluorescent tracer pump 110 is in fluid communication with a source of fluorescent tracer 114 to be introduced into a feed stream contacting membrane 102. In operation, a feed stream 114 is supplied to membrane 102, which is capable of treating or purifying the feed stream by dividing the feed stream into at least a first stream and a second stream, such as a permeate stream 116 and a concentrate stream 118 (which may also be referred to as a reject stream).

Fluorometer 104 is optically connected to one or more of feed stream 114, permeate stream 116, and/or concentrate stream 118 and is configured to fluorometrically analyze the stream. In the illustrated configuration, a single fluorometer 104 is illustrated as being positioned to receive slip streams from each of the feed stream 114, permeate stream 116, and concentrate stream 118. When so configured, valves or other flow control mechanisms may be used to selectively place the fluorometer in fluid communication with each of the respective streams at different times. In other configurations, fluorometer 104 may be implemented to only fluorometrically analyze a single stream (e.g., feed stream 114 or permeate stream 116), or two of the three stream (e.g., feed stream 114 and permeate stream 116). In these alternative configurations, system 100 may include more than one fluorometer, such as a separate fluorometer for each stream to be fluorometrically analyzed during operation.

Controller 106 is communicatively connected to fluorometer 104, feed stream pressurization pump 108, fluorescent tracer pump 110, and optionally any other controllable components or sensors that may be desirably implemented in system 100. Controller 106 includes processor 120 and memory 122. Controller 106 communicates with controllable components in system 100 via connections. For example, signals generated by fluorometer 104 may be communicated to controller 106 via a wired or wireless connection, which in the example of FIG. 1 is illustrated as wired connection. Memory 122 stores software for running controller 106 and may also store data generated or received by processor 120, e.g., from fluorometer 104. Processor 120 runs software stored in memory 122 to manage the operation of system 100.

As described in greater detail below, fluorometer 104 may be used to fluorometrically analyze the separation performance of membrane 102. Fluorometer 104 can emit excitation light into a fluid stream/sample under analysis and receive fluorescent emissions generated in response to the excitation light. The amount of fluorescent emission light detected by the fluorometer can be processed with reference to calibration information stored in memory to determine a concentration of a fluorescing tracer in the fluid sample under analysis. This, in turn, can provide an indication of the separation performance of membrane 102. Fluorometer 104 can be recalibrated as will be described to help calibration errors that may arise during operation of the fluorometer.

During operation of system 100, membrane 102 can be contacted with fluid to be purified from source 112 to remove ion, molecules, pathogens, and/or other particulate contaminants. For example, feed stream 114 can contain various solutes, such as dissolved organics, dissolved inorganics, dissolved solids, suspended solids, the like or combinations thereof. Upon separation of feed stream 114 into permeate stream 116 and concentrate stream 118, in membrane 102, the permeate stream can contain a substantially lower concentration of dissolved and/or suspended solutes as compared to the feed stream. On the other hand, the concentrate stream 118 can have a higher concentration of dissolved and/or suspended solutes as compared to the feed stream. In this regard, the permeate stream 116 represents a purified feed stream, such as a purified aqueous feed stream.

System 100 and membrane 102 can be configured for any desired type of membrane separation process, including cross flow separation processes, dead-end flow separation processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Typically, however, system 100 and membrane 102 may be implemented as a reverse osmosis, ultrafiltration, microfiltration, or nanofiltration membrane separation process.

In reverse osmosis, feed stream 114 is typically processed under cross flow conditions. When so configured, feed stream 114 may flow substantially parallel to the membrane surface such that only a portion of the feed stream diffuses through the membrane as permeate. The cross flow rate is typically high in order to provide a scouring action that lessens membrane surface fouling. This can also decrease concentration polarization effects (e.g., concentration of solutes in the reduced-turbulence boundary layer at the membrane surface, which can increase the osmotic pressure at the membrane and thus can reduce permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

System 100 can employ a variety of different types of membranes as membrane 102. Such commercial membrane element types include, without limitation, hollow fiber membrane elements, tubular membrane elements, spiral-wound membrane elements, plate and frame membrane elements, and the like. For example, reverse osmosis typically uses spiral wound elements or modules, which are constructed by winding layers of semi-porous membranes with feed spacers and permeate water carriers around a central perforated permeate collection tube. Typically, the modules are sealed with tape and/or fiberglass over-wrap. The resulting construction may have one channel that can receive an inlet flow. The inlet stream flows longitudinally along the membrane module and exits the other end as a concentrate stream. Within the module, water can pass through the semi-porous membrane and is trapped in a permeate channel, which flows to a central collection tube. From this tube it can flow out of a designated channel and is collected.

In different applications, membrane 102 can be implemented using a single membrane element or multiple membrane elements depending on the application. For example, multiple membrane elements may be used forming membrane modules that are stacked together, end to end, with inter-connectors joining the permeate tubes of the first module to the permeate tube of the second module, and so on. These membrane module stacks can be housed in pressure vessels. Within the pressure vessel, feed stream 114 can pass into the first module in the stack, which removes a portion of the water as permeate water. The concentrate stream from the first membrane can then become the feed stream of the second membrane and so on down the stack. The permeate streams from all of the membranes in the stack can be collected in the joined permeate tubes. In these applications, the feed stream entering the first module and/or the combined permeate stream and/or the final concentrate stream from the last module in the stack may be monitored using one or more fluorometers 104.

Within most reverse osmosis systems, pressure vessels may be arranged in either "stages" or "passes." In a staged membrane system, the combined concentrate streams from a bank of pressure vessels can be directed to a second bank of pressure vessels where they become the feed stream for the second stage. Commonly, systems have two to three stages with successively fewer pressure vessels in each stage. For example, a system may contain four pressure vessels in a first stage, the concentrate streams of which feed two pressure vessels in a second stage, the concentrate streams of which in turn feeds one pressure vessel in the third stage. This is designated as a "4:2:1" array. In a staged membrane configuration, the combined permeate streams from all pressure vessels in all stages may be collected and used without further membrane treatment. Multi-stage systems are commonly used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels can be combined without further membrane treatment of each individual stream. Multi-pass systems are typically used when very high purity water is required, for example in the microelectronics or pharmaceutical industries. When system 100 is implemented as a reverse osmosis process, one or more membranes 102 may be configured as a multi-stage and/or multi-pass system.

While system 100 and membrane 102 may be implemented as cross-flow filtration process, in other configurations, the system may be arranged for conventional filtration of suspended solids by passing feed stream 114 through a filter media or membrane in a substantially perpendicular direction. This arrangement can create one exit stream (e.g., purified stream 114) during the service cycle. Periodically, the filter may be backwashed by passing a clean fluid in a direction opposite to the feed, generating a backwash effluent containing species that have been retained by the filter. In this arrangement, system 100 may have a feed stream 114, a purified stream 116, and a backwash stream 118. This type of membrane separation is typically referred to as dead-end flow separation and is typically limited to the separation of suspended particles greater than about one micron in size.

To monitor the performance of membrane 102, a fluorescent tracer from fluorescent tracer source 113 can be introduced into feed stream 114. Operating under the control of controller 106, fluorescent tracer pump 110 can inject fluorescent tracer into feed stream 114 upstream of membrane 102. In the illustrated example, fluorescent tracer is shown as being introduced upstream of feed stream pump 108, although in other configurations, may be introduced downstream of the feed stream pump. In either case, the feed stream 114 containing an amount of fluorescent tracer can contact membrane 102 to undergo a separation or purification process.

As with other molecules or particulates being separated out of the feed stream, a majority of the fluorescent tracer may be concentrated in concentrate stream 118. Only a small minority of the fluorescent tracer introduced into feed stream 114 may carry through to permeate stream 116, e.g., when membrane 102 is functioning as intended. The amount of fluorescent tracer passing through membrane 102 from feed stream 114 and into permeate stream 116 may be indicative of the quality and/or operational efficiency of the membrane. For example, if membrane 102 has an integrity breach affecting the separation efficiency of the membrane, a higher concentration of fluorescent tracer introduced into feed stream 114 via fluorescent tracer pump 110 may carry through to permeate stream 116 than if the membrane does not have such a breach.

Operating on a periodic or continuous monitoring basis, one or more fluorometers 104 can monitor the concentration of fluorescent tracer in one or more corresponding streams of system 100 to evaluate the performance of the system. For example, fluorometer 104 may measure feed stream 114 to determine a measured concentration of the fluorescent tracer introduced into the stream by fluorescent tracer pump 110. Fluorometer 104 may also measure permeate stream 116 to determine a measured concentration of the fluorescent tracer passing through membrane 102 and present in permeate stream 116.

Various performance metrics can be determined based on the measured fluorescent properties of the monitored streams. As one example, controller 106 may calculate a dye rejection efficiency factor $R_t$ based on the following equation:

$$R_t(\%) = \frac{(C_{F,t} - C_{F,BKG}) - (C_{P,t} - C_{P,BKG})}{C_{F,t} - C_{F,BKG}} \times 100 \qquad \text{Equation 1}$$

In the equation above, $R_t$ is the dye rejection efficiency, $C_F$ is the fluorescent dye concentration of the feed stream, $C_p$ is the fluorescent dye concentration of the permeate stream, $C_{F,BKG}$ is the background fluorescence of the feed stream, and $C_{P,BKG}$ is the background fluorescence of the permeate stream. Additional performance parameters that may be calculated by controller 106 with reference to information stored in memory 122 and data from fluorometer 104 are described in U.S. Pat. No. 6,838,001, the entire contents of which are incorporated herein by reference.

In normal operation, the dye rejection efficiency of membrane 102 may be greater than 95 percent, such as greater than 98 percent, greater than 99 percent, or greater than 99.9 percent. For example, controller 106 may control fluorescent tracer pump 110 to introduce an amount of fluorescent tracer into feed stream 114 effective to achieve a concentration ranging from 10 parts per billion (ppb) to 100,000 ppb, such as from 10 ppb to 1000 ppb, or from 10 ppb to 10,000 ppb. By comparison, the amount of fluorescent tracer passing through membrane 102 and present in permeate stream 116 at these feed stream concentrations may be less than 10 ppb, such as less than 5 ppb, or less than 1 ppb, or less than 100 parts per trillion (ppt). Controller 106 can control fluorescent tracer pump 110 to introduce the tracer at a substantially constant rate and/or to achieve a substantially constant concentration in feed stream 114 (e.g., adjusting the rate of introduction based on flow rate changes to feed stream 114). Alternatively, the rate and/or concentration of the fluorescent tracer may vary over time.

In general, the fluorescent tracer introduced into feed stream 114 is an inert tracer. The term "inert" refers to a fluorescent tracer that is not appreciably or significantly affected by any other chemistry in the system, or by the other system parameters such as pH, temperature, ionic strength, redox potential, microbiological activity or biocide concentration. The fluorescent tracer should be transportable with the water of the membrane separation system and thus substantially, if not wholly, water-soluble therein at the concentration it is used, under the temperature and pressure conditions specific and unique to the membrane separation system. In other words, the fluorescent tracer may display properties similar to a solute of the membrane separation process in which it is used.

In some examples, the fluorescent tracer added to feed stream 114 is a component of a formulation, rather than as a separate component, such as a dry solid or neat liquid. For example, the fluorescent tracer may be contained in (e.g., intermixed with) treatment chemicals injected into feed stream 114 to enhance the membrane separation process, e.g., antiscalants that retard/prevent membrane scale deposition, antifoulants that retard/prevent membrane fouling, biodispersants, microbial-growth inhibiting agents, such as biocides and cleaning chemicals that remove membrane deposits. The composition containing the fluorescent tracer may include an aqueous or other water-soluble solution or other substantially homogeneous mixture that disperses with reasonable rapidity in the membrane separation system to which it is added. In applications where the fluorescent tracer composition (or product containing the fluorescent tracer) is in solid form, fluorescent tracer pump 108 may be replaced with a solid metering device.

A variety of different and suitable types of compounds can be utilized as fluorescent tracers. Example fluorescent compounds that can be used in system 100 include, but are not limited to: 3,6-acridinediamine, N,N,N',N'-tetramethyl-, monohydrochloride, also known as Acridine Orange (CAS Registry No. 65-61-2); 2-anthracenesulfonic acid sodium salt (CAS Registry No. 16106-40-4); 1,5-anthracenedisulfonic acid (CAS Registry No. 61736-91-2) and salts thereof; 2,6-anthracenedisulfonic acid (CAS Registry No. 61736-95-6) and salts thereof; 1,8-anthracenedisulfonic acid (CAS Registry No. 61736-92-3) and salts thereof; anthra[9,1,2-cde]benzo[rst]pentaphene-5, 10-diol, 16,17-dimethoxy-, bis (hydrogen sulfate), disodium salt, also known as Anthrasol Green IBA (CAS Registry No. 2538-84-3, aka Solubilized Vat Dye); bathophenanthrolinedisulfonic acid disodium salt (CAS Registry No. 52746-49-3); amino 2,5-benzene disulfonic acid (CAS Registry No. 41184-20-7); 2-(4-aminophenyl)-6-methylbenzothiazole (CAS Registry No. 92-364); 1H-benz[de]isoquinoline-5-sulfonic acid, 6-amino-2,3-dihydro-2-(4-methylphenyl)1,3-dioxo-, monosodium salt, also known as Brilliant Acid Yellow 8G (CAS Registry No. 2391-30-2, aka Lissamine Yellow FF, Acid Yellow 7); phenoxazin-5-ium, 1-(aminocarbonyl)-7-(diethylamino)-3,4-dihydroxy-, chloride, also known as Celestine Blue (CAS Registry No. 1562-90-9); benzo[a]phenoxazin-7-ium, 5,9-diamino-, acetate, also known as cresyl violet acetate (CAS Registry No. 10510-54-0); 4-dibenzofuransulfonic acid (CAS Registry No. 42137-76-8); 3-dibenzofuransulfonic acid (CAS Registry No. 215189-98-3); 1-ethylquinaldinium iodide (CAS Registry No. 606-53-3); fluorescein (CAS Registry No. 2321-07-5); fluorescein, sodium salt (CAS Registry No. 518-47-8, aka Acid Yellow 73, Uranine); Keyfluor White ST (CAS Registry No. 144470-48-4, aka Flu. Bright 28); benzenesulfonic acid, 2,2'-(1,2-ethenediyl) bis[5-[[4-[bis(2-hydroxyethyl)amino]-6-[(4-sulfophenyl) amino]-1,3,5-triazin-2-yl]amino]-, tetrasodium salt, also known as Keyfluor White CN (CAS Registry No. 16470-24-9); C.I. Fluorescent Brightener 230, also known as Leucophor BSB (CAS Registry No. 68444-86-0); benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Leucophor BMB (CAS Registry No. 16470-249, aka Leucophor U, Flu. Bright. 290); 9,9'-biacridinium, 10,10'-dimethyl-, dinitrate, also known as Lucigenin (CAS Registry No. 2315-97-1, aka bis-N-methylacridinium nitrate); 1-deoxy-1-(3,4-dihydro-7,8-dimethyl-2,4-dioxobenzo[g]pteridin-10(2H)-yl)-D-ribitol, also known as Riboflavin or Vitamin B2 (CAS Registry No. 83-88-5); mono-, di-, or tri-sulfonated napthalenes, including but not limited to 1,5-naphthalenedisulfonic acid, disodium salt (hydrate) (CAS Registry No. 1655-29-4, aka 1,5-NDSA hydrate); 2-amino-1-naphthalenesulfonic acid (CAS Registry No. 81-16-3); 5-amino-2-naphthalenesulfonic acid (CAS Registry No. 119-79-9); 4-amino-3-hydroxy-1-aphthalenesulfonic acid (CAS Registry No. 90-51-7); 6-amino-4-hydroxy-2-naphthalenesulfonic acid (CAS Registry No. 116-63-2); 7-amino-1,3-naphthalenesulfonic acid, potassium salt (CAS Registry No. 79873-35-1); 4-amino-5-hydroxy-2,7-naphthalenedisulfonic acid (CAS Registry No. 90-20-0); 5-dimethylamino-1-naphthalenesulfonic acid (CAS Registry No. 4272-77-9); 1-amino-4-naphthalene sulfonic acid (CAS Registry No. 84-86-6); 1-amino-7-naphthalene sulfonic acid (CAS Registry No. 119-28-8); 2,6-naphthalenedicarboxylic acid, dipotassium salt (CAS Registry No. 2666-06-0); 3,4,9,10-perylenetetracarboxylic acid (CAS Registry No. 81-32-3); C.I. Fluorescent Brightener 191, also known as Phorwite CL (CAS Registry No. 12270-53-0); C.I. Fluorescent Brightener 200, also known as Phorwite BKL (CAS Registry No. 61968-72-7); benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3); benzenesulfonic acid, 5-(2H-naphtho[1,2-d]triazol-2-yl)-2-(2-phenylethenyl)-, sodium salt, also known as Pylaklor White S-ISA (CAS Registry No. 6416-68-8); 1,3,6,8-pyrenetetrasulfonic acid, tetrasodium salt (CAS Registry No. 59572-10-0); pyranine (CAS Registry No. 6358-69-6, aka 8-hydroxy-1,3,6-pyrenetrisulfonic acid, trisodium salt),quinoline (CAS Registry No. 91-22-5); 3H-phenoxazin-3-one, 7-hydroxy-, 10-oxide, also known as Rhodalux (CAS Registry No. 550-82-3); xanthylium, 9-(2, 4-dicarboxyphenyl)-3,6-bis(diethylamino)-, chloride, disodium salt, also known as Rhodamine WT (CAS Registry No. 37299-86-8); phenazinium, 3,7-diamino-2,8-dimethyl-5-phenyl-, chloride, also known as Safranine 0 (CAS Registry No. 477-73-6); C.I. Fluorescent Brightener 235, also known as Sandoz CW (CAS Registry No. 56509-06-9); benzenesulfonic acid, 2,2'-(1,2-thenediyl)bis[5-[[4-bis(2-hydroxyethyl)amino]-6-[(4-sulfophenyl)amino]-1,3,5-triazin-2-yl] amino]-, tetrasodium salt, also known as Sandoz CD (CAS Registry No. 16470-24-9, aka Flu. Bright. 220); benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4); xanthylium, 3,6-bis(diethylamino)-9-(2,4-disulfophenyl)-, inner salt, sodium salt, also known as Sulforhodamine B (CAS Registry No. 3520-42-1, aka Acid Red 52); benzenesulfonic acid, 2,2'-(1,2-ethenediyl)bis[5-[[4-Raminomethyl)(2-hydroxyethyl)amino]-6-(phenylamino)-1,3,5-triazin-2-yl]amino]-, disodium salt, also known as Tinopal 5BM-GX (CAS Registry No. 169762-28-1); Tinopol DCS (CAS Registry No. 205265-33-4); benzenesulfonic acid, 2,2'-([1,1'-biphenyl]-4,4'-diyldi-2,1-ethenediyl)bis-, disodium salt also known as Tinopal CBS-X (CAS Registry No. 27344-41-8); benzenesulfonic acid, 5-(2H-naphtho[1,2-d]triazol-2-yl)2-(2-phenylethenyl)-, sodium salt, also known as Tinopal RBS 200, (CAS Registry No. 6416-68-8); 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

In some examples, the fluorescent tracer is not a visible dye, e.g., such that the fluorescent tracer is a chemical species that does not have a strong absorption of electromagnetic radiation in the visible region, which extends from about 4000 Angstroms to about 7000 Angstroms (from about 400 nanometers ("nm") to about 700 nm). For example, the fluorescent tracer may be chosen from a class of materials which are excited by absorption of light and produce fluorescent light emission, where the excitation and emission light occurs at any point within the far ultraviolet to near infrared spectral regions (e.g., wavelengths from 200-800 nm).

System 100 can be used to purify any desired type of fluid. Example aqueous (water-based) liquid feed sources 112 that may be purified using system 100 include raw water streams (e.g., extracted from a fresh water source), waste water and recycle water streams (e.g., from municipal and/or industrial sources), streams in food and beverage processes, streams in pharmaceutical processes, streams in electronic manufacturing, streams in utility operations, streams in pulp and paper processes, streams in mining and mineral processes, streams in transportation-related processes, streams in textile processes, streams in plating and metal working processes, streams in laundry and cleaning processes, streams in leather and tanning processes, streams in paint processes, and combinations thereof.

The one or more fluorometers 104 used in system 100 may be implemented in a number of different ways in system 100. In the example shown in FIG. 1, a pipe, tube, or other conduit is connected between a main fluid pathway and a flow chamber of fluorometer 104, e.g., providing a slip stream or sample stream from the bulk of flowing liquid. In such examples, the conduit can fluidly connect the flow chamber (e.g., an inlet of the flow chamber) of fluorometer 104 to the main fluid pathway. As fluid moves through the main fluid pathway, a portion of the fluid may enter the conduit and pass adjacent a sensor head positioned within a fluid chamber, thereby allowing fluorometer 104 to determine one or more characteristics of fluid flowing through the fluid pathway. After passing through the flow chamber, analyzed fluid may or may not be returned to the main fluid pathway, e.g., via another conduit connecting an outlet of the flow chamber to the fluid pathway. In alternative configurations, fluorometer 104 positioned in-line with a main fluid pathway, e.g., allowing the fluorometer to directly sample and/or fluorometrically analyze the primary flowing fluid stream without drawing a slip stream.

In either case, when implemented to receive fluid directly from a main fluid pathway or stream without user intervention, fluorometer 104 may be characterized as an online optical sensor. Controller 106 may control fluorometer 104 to continuously fluorometrically analyze a fluid stream over a period of time or intermittently fluorometrically analyze the fluid stream at periodic intervals. When fluorometer 104 is implemented as an online fluorometer, it may be difficult to remove the fluorometer from service for calibration if such removal may require shutting down system 100 or causing undesirable monitoring gaps in the performance of the system.

In other applications, fluorometer 104 may be used to fluorometrically analyze a stationary volume of fluid that does not flow through a flow chamber of the optical sensor. For example, in these alternative configurations, fluorometer 104 may be implemented as an offline monitoring tool (e.g., as a handheld sensor), that requires filling the optical sensor with a fluid sample manually extracted from system 100.

Figure 2:
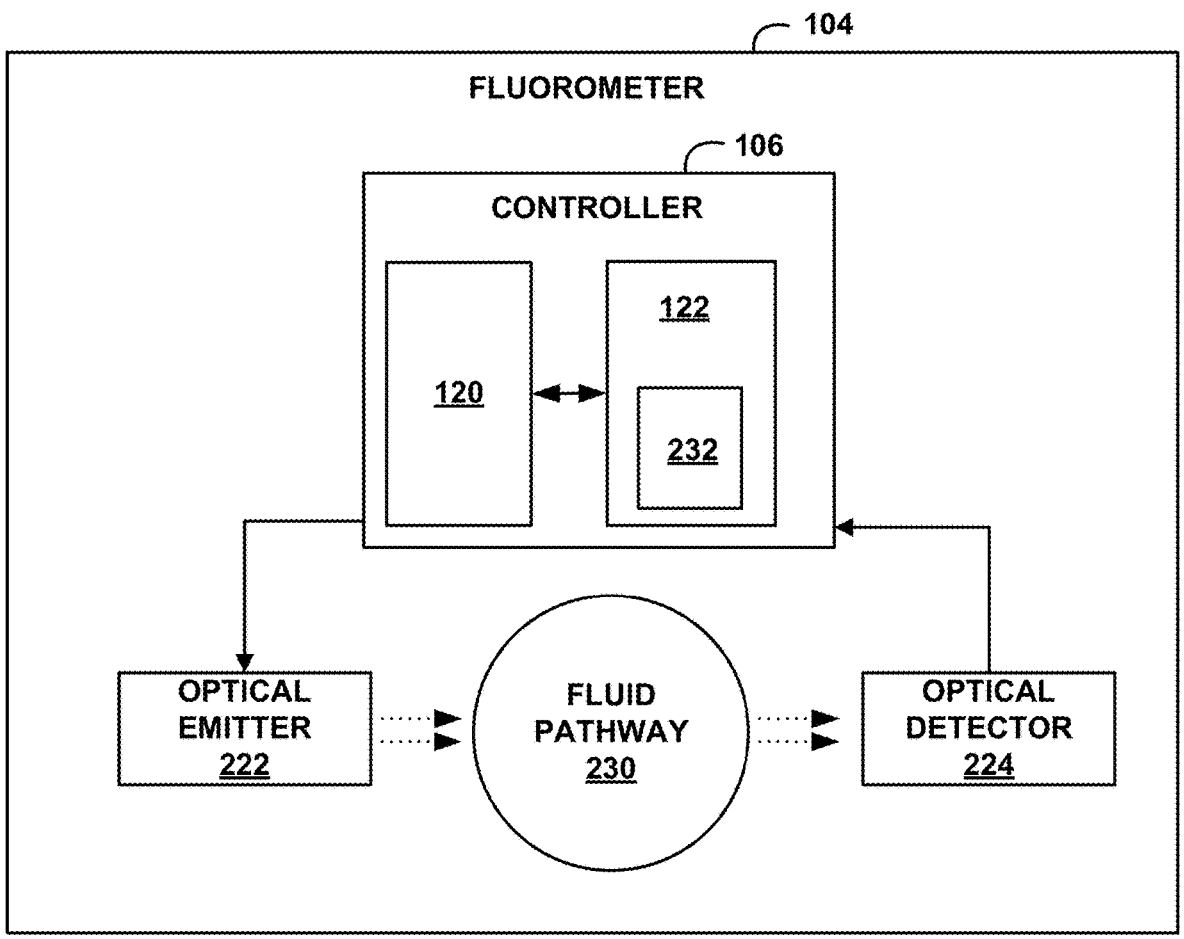
FIG. 2 is a block diagram illustrating an example fluorometer that may be used in the example fluid system of FIG. 1.

FIG. 2 is a block diagram illustrating an example of fluorometer 104 that may be used in the fluid separation system of FIG. 1. Fluorometer 104 includes controller 106, one or more optical emitters 222 (referred to herein as "optical emitter 222"), and one or more optical detectors 224 (referred to herein as "optical detector 224"). Controller 106 includes previously-described processor 120 and a memory 122. Optical emitter 222 directs light into fluid pathway 230 and optical detector 224 receives transmitted light on the opposite side of the fluid pathway. The components of fluorometer 104 may be implemented on a single printed circuit board (PCB) or may be implemented using two or more PCB boards. Further, in some examples, fluorometer 104 communicates with an external device, such as a system controller controlling system 100, remote server, cloud-computing environment, or other physically remote computing device.

For purposes of discussion, controller 106 described with respect to FIG. 1 as controlling system 100 is also illustrated as the controller controlling fluorometer 104. In practice, fluorometer 104 may have a separate controller from one or more system controller controlling the overall operation of system 100. Accordingly, it should be appreciated that the computing functionality attributed to controller 106 in system 100 and fluorometer 104 may be performed on any one or more controllers associated with the system, be it physically onsite or remotely located, and the functionalities described herein are not limited to being performed on any specific hardware device.

Memory 122 stores software and data used or generated by controller 106. For example, memory 122 may store data representative of one or more calibration curves 232 used by controller 106 to determine a concentration of a fluorescent tracer in fluid medium passing through fluid pathway 230.

Calibration curve data 232 may relate fluorescent emission light detected by optical detector 224 to a concentration of a fluorescent tracer in the fluid under analysis. In some examples, calibration curve data 232 is in the form of an equation that relates light measurements taken by optical detector 224 to fluorescent tracer concentration information. For example, the equation may be a single or higher-order equation having one or more slope coefficients and an intercept, each of which are stored in memory and referenced by controller 106 to convert light information measured by optical detector 224 to fluorescent tracer concentration information.

For ease of description, calibration curve data 232 is generally described below as being calibration information that is determined by fluorometer 104 and stored in memory 122 of the fluorometer. In other examples, calibration curve data 232 may be determined separately from fluorometer 104 (e.g., using a laboratory spectrophotometer and computing device) and stored in memory 122 and/or a separate computing device communicatively coupled to fluorometer 104. Therefore, although fluorometer 104 is described below as being configured to determine calibration curve data 232 and further being configured to determine a measured concentration of fluorescent tracer, it should be appreciated that the disclosure is not limited to such an example sensor. In different examples, hardware and/or software operating outside of fluorometer 104 may be utilized to implement functions attributed to fluorometer 104 in this disclosure.

In examples in which fluorometer 104 determines calibration curve data 232, the calibration curve data may be based on an analysis of baseline detection values produced by optical detector 224 and processed by controller 106. The baseline detection values may be detected by optical detector 224 when one or more fluid solutions having a known concentration of fluorescent tracer are passed through fluid pathway 230. These fluid solutions having a known concentration of fluorescent tracer may be referred to as reference solutions. For example, controller 106 may determine calibration curve data by fluorometrically analyzing a first fluid substantially or entirely devoid of a fluorescent tracer, a second fluid having a known concentration of the fluorescent tracer, and optionally one or more additional fluids having known concentrations of the fluorescent tracer different than the second fluid (e.g., covering the range of fluorescent tracer concentrations expected to be measured by fluorometer 104 in subsequent operation).

Upon receiving detection values from the reference fluids, processor 120 of controller 106 (or a processor of another computing device) can analyze the detection values to establish a relationship between the known characteristic and the detection values. For example, processor 120 may perform a curve fitting process such as linear regression to determine a relationship between the known concentration of fluorescent tracer and the detected fluorescent emissions. The determined relationship (or coefficients associated therewith) can then be stored as calibration curve data 232.

In the example of a single order calibration curve, for example, controller 106 may fit a curve representing known fluorescent tracer concentration values plotted on a y-axis of a graph with corresponding measured fluorescent emissions plotted on the x-axis of the graph. A first order curve having the form $y=m*x+b$, where y is the fluorescent tracer concentration, x is the measured fluorescent emissions, and m is the slope of the curve, and b is the intercept of the curve, may be fit to the data to determine slope and intercept calibration values. The slope and intercept values can be stored as calibration curve data 232 in memory 122. In the case of a higher order curve (e.g., second order, third order, or higher), additional coefficients corresponding to the higher order curve may be stored in memory (e.g., in addition to the intercept). Controller 106 may employ any suitable statistical software package such as, e.g., Minitab, Excel, or the like, to generate calibration curve data 232.

Processor 120 runs software stored in memory 122 to perform functions attributed to fluorometer 104 and controller 106 in this disclosure. Components described as processors within controller 106, controller 106, or any other device described in this disclosure may each include one or more processors, such as one or more microprocessors, digital signal processors (DSPs), application specific integrated circuits (ASICs), field programmable gate arrays (FPGAs), programmable logic circuitry, or the like, either alone or in any suitable combination.

Optical emitter 222 includes at least one optical emitter that emits radiation having a specified wavelength or wavelength range. In different examples, optical emitter 222 can emit radiation continuously or intermittently. In some examples, optical emitter 222 emits radiation at a plurality of discrete wavelengths. For example, optical emitter 222 may emit at two, three, four or more discrete wavelengths.

Optical emitter 222 can emit light at any suitable wavelength, as described in greater detail below. In some examples, optical emitter 222 emits light within a spectrum ranging from 10 nm to 700 nm. Light emitted by optical emitter 222 propagates through fluid pathway 230 of fluorometer 104 and may be detected by optical detector 224. In response to receiving the optical energy, fluorescing molecules within the fluid may excite, causing the molecules to produce fluorescent emissions. The fluorescent emissions, which may or may not be at a different frequency than the energy emitted by optical emitter 222, may be generated as excited electrons within fluorescing molecules change energy states. The energy emitted by the fluorescing molecules may be detected by optical detector 224. For example, optical detector 224 may detect fluorescent emissions emitted in a frequency range from 50 nm to 800 nm.

Optical detector 224 includes at least one optical detector that detects radiation within associated wavelength ranges within the UV light spectrum. Optical detector 224 detects radiation that is emitted by optical emitter 222 and that has propagated through fluid pathway 230 and any fluid solution in the fluid pathway. Optical detector 224 may be implemented using multiple detectors, one for each wavelength or wavelength range, or may be implemented using a single detector such as, e.g., a detector that is programmable to detect multiple wavelength ranges.

Controller 106 controls the operation of optical emitter 222 and receives signals concerning the amount of light detected by optical detector 224. In some examples, controller 106 further processes signals, e.g., to develop calibration curve data 232 and/or to determine a concentration of fluorescent tracer in a fluid solution passing through fluid pathway 230 using calibration curve data 232. While controller 106 may perform various signal processing functionalities, as described herein, controller 106 need not be configured to perform any or all of the described functionalities. In different examples, signal processing, e.g., to develop calibration curve data 232 and/or to determine a characteristic of a fluid solution based on calibration curve data 232 may be performed outside of fluorometer 104. For example, controller 106 (FIG. 1) or another controller may perform one or more functions generally attributed to controller 106 in this disclosure. Accordingly, it should be appreciated that functions attributed to controller 106 herein are for ease of description, and the described functions may, in fact, be implemented within fluorometer 104 or within one or more separate devices, which may or may not be communicatively coupled to fluorometer 104.

In one example in which controller 106 processes signals, controller 106 controls optical emitter 222 and optical detector 224 to create calibration curve data 232. When fluorometer 104 is informed of one or more known characteristics of a reference solution flowing through fluid pathway 230, controller 106 controls optical emitter 222 to emit radiation at one or more wavelengths and further controls optical detector 224 to detect the radiation at one or more wavelengths. Fluorometer 104 may be so informed, for example, via manual input from a user. Controller 106 processes signals concerning the amount of light detected by optical detector 224 to determine fluorescent emission characteristics of the reference solution. For example, controller 106 may process signals concerning the magnitude and/or wavelength(s) of light detected by optical detector 224 for different reference solutions having different known concentrations of fluorescent tracer. Controller 106 may store the data in memory 122.

After determining the amount of light detected by optical detector 224 through the reference solutions, controller 106 can process the light detection information to develop a relationship between the known concentration of fluorescent tracer in the reference solutions and the light detection information. Controller 106 can store the relationship as calibration curve data 232 in memory 122. In subsequent operation, controller 106 can determine a measured concentration of the fluorescent tracer based on the magnitude of fluorescent emissions detected by 224 from a fluid having an unknown concentration of the fluorescent tracer (e.g., feed stream 114 and/or permeate stream 116) using calibration curve data 232, which relates measured fluorescent emissions to fluorescent tracer concentrations.

As briefly discussed above, fluorometer 104 may be calibrated prior to being implemented in system 100 or initially being installed in the system, e.g., prior to use in ongoing operation and/or during periodic full recalibration. During full calibration, calibration curve data 232 that includes a calibration curve intercept value may be determined and stored in memory 122. As fluorometer is used during subsequent operation of system 100 to determine measured concentrations of fluorescent tracer (e.g., in feed stream 114 and/or permeate stream 116), the accuracy of the measured concentrations may decrease. That is, the difference between the actual or real value of the fluorescent tracer in the stream being measured and the measured concentration determined by fluorometer 104 may increase over time, increasing the inaccuracy of the measured concentration determined by the fluorometer. The fluorometer may lose calibration for a variety of reasons, such as fouling buildup, changing electrical resistance of a circuit, changing light source strength, and/or other factors.

To help increase the accuracy of the measured fluorescent concentrations determined by fluorometer 104, the fluorometer may undergo a partial recalibration. The partial calibration may recalibrate the intercept for the calibration curve data 232, e.g., without recalibrating the slope. For example, calibration curve data 232 stored in memory 122 and used by controller 106 to convert measured fluorescent emission data to measured fluorescent tracer concentration data may include a stored calibration curve intercept and stored calibration curve slope coefficients. During partial recalibration, the stored calibration curve intercept may be changed without changing the stored calibration curve slope coefficients.

While full recalibration may lead to even further accuracy improvements over a partial recalibration, full recalibration may require removing fluorometer 104 from service or otherwise exposing the fluorometer to multiple reference solutions. Partial recalibration as described in some applications herein may be achieved by controlling the introduction of fluorescent tracer into feed stream 114. The partial recalibration may provide meaningful accuracy improvements for fluorometer 104 and, optionally, may be performed while the fluorometer remains online (e.g., without disconnecting or removing the fluorometer from a housing or fluid conduit to which it is connected or otherwise removing the fluorometer from its operating environment).

Figure 3:
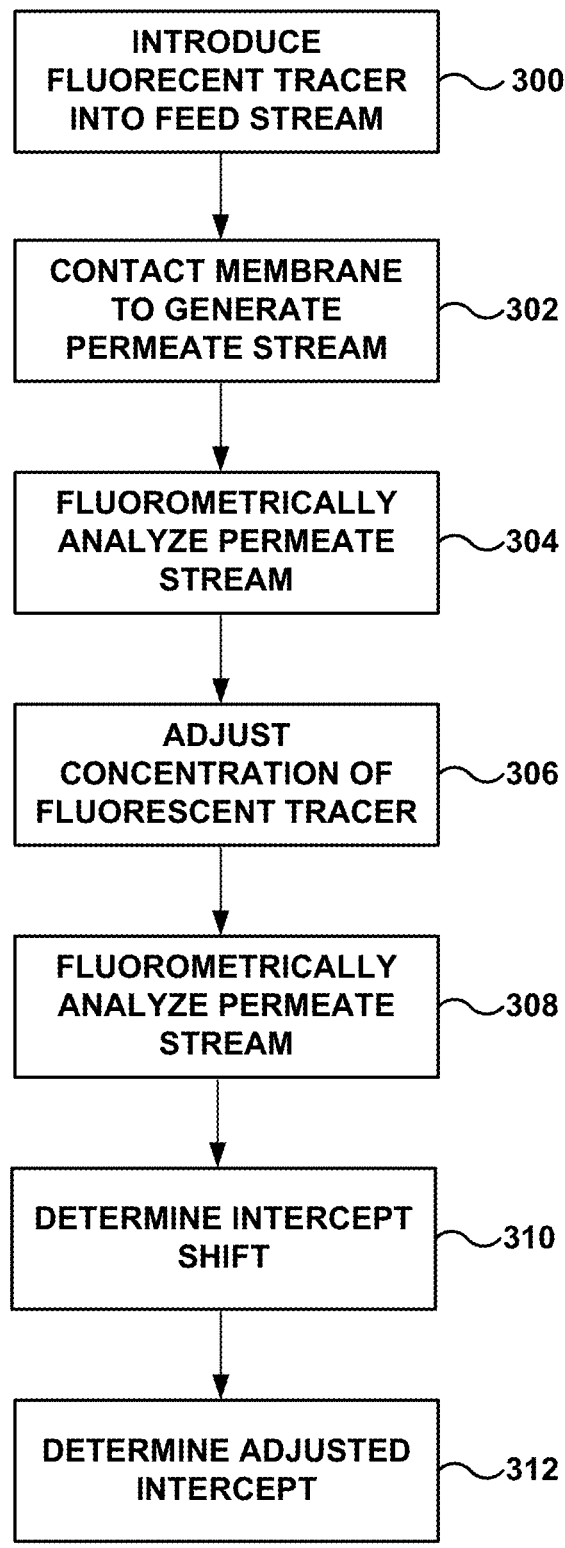
FIG. 3 is a flow diagram illustrating an example process by which the fluorometer of FIGS. 1 and 2 can be recalibrated.

FIG. 3 is an example technique for recalibrating fluorometer 104. The technique of FIG. 3 is described with reference to system 100 in FIG. 1 and fluorometer 104 in FIG. 2, although can be performed in other systems and with other fluorometer configurations, e.g., as described herein.

With reference to FIG. 3, the technique includes introducing a fluorescent tracer into feed stream 114 to provide a first concentration of fluorescent tracer in the feed stream. (300) Operating under the control of controller 106 in system 100, fluorescent tracer pump 110 may be controlled to introduce fluorescent tracer into feed stream 114 from fluorescent tracer source 113. The amount of fluorescent tracer introduced into feed stream 114 may be effective to provide a concentration of fluorescent tracer in feed stream 114 within any of the concentration ranges discussed herein, or even concentration ranges outside of those discussed herein in suitable applications.

Feed stream 114 contacts membrane 102, separating the feed stream into permeate stream 116 and concentrate stream 118. (302) Membrane 102 may be configured as a cross flow membrane, dead-end flow membrane, or have yet other configuration. In one example, system 100 is a reverse osmosis system. Feed stream pressure pump 108 can pressurize a source of liquid to be purified, overcoming the osmotic pressure of membrane 102 to drive the reverse osmosis process and generate the permeate stream 116.

During operation, fluorometer 104 can fluorometrically analyze permeate stream 116 generated from the feed stream 114 in which the fluorescent tracer was introduced, e.g., in an amount effective to achieve the first concentration of fluorescent tracer in the feed stream. (304) For example, fluorometer 104 may be installed online in system 100 to measure permeate 116 flowing from membrane 102 (e.g., either in the main fluid conveyance line carrying the bulk of the permeate stream or via a slipstream connecting fluorometer 104 to the main conveyance line). Permeate stream 116 or a sample thereof can flow through fluid pathway 230 for measurement by fluorometer 104. Controller 106 executing instructions stored in memory 122 can control optical emitter 222 to direct light selected to be at an excitation wavelength for the fluorescent tracer introduced into feed stream 114 into the permeate fluid under analysis. Fluorescent tracer molecules within permeate under analysis may fluoresce at a wavelength different than the excitation wavelength in response to the energy emitted at the excitation wavelength. Optical detector 224 can detect the fluorescent emissions emitted by the tracer molecules present within the permeate. The magnitude of the fluorescent emissions detected by optical detector 224 may vary based on the concentration of the fluorescent tracer molecules present in the permeate under analysis.

Processor 120 of controller 106 can determine a first measured concentration of the fluorescent tracer in permeate stream 116 based on the fluorescent emissions detected by optical detector 224 and calibration curve data 232 stored in memory 122. For example, processor 120 of controller 106 may use one or more stored slope coefficients and a stored intercept of a calibration curve relating to a magnitude of light detected by optical detector 224 (e.g., within one or more wavelengths corresponding to fluorescent emissions of the fluorescent tracer) to a measured concentration of the fluorescent tracer. The first measured concentration of fluorescent tracer determined by processor 120 can be stored in memory 122 for subsequent use during the calibration procedure.

The example technique of FIG. 3 also includes adjusting the concentration of fluorescent tracer introduced into feed stream 114 to provide a second concentration of fluorescent tracer in the feed stream different than the first concentration. (306) Under the control of controller 106 in system 100, the rate at which fluorescent tracer pump 110 introduces fluorescent tracer into feed stream 114 from fluorescent tracer source 113 and/or the rate at which feed stream 114 is delivered to membrane 102 may be adjusted to adjust the concentration of fluorescent tracer in the feed stream contacting member 102. In one example, the concentration of fluorescent tracer is increased such that the second concentration of fluorescent tracer in feed stream 114 is greater than the first concentration of fluorescent tracer. In another example, the concentration of fluorescent tracer is decreased such that the second concentration of fluorescent tracer in feed stream 114 is less than the first concentration of fluorescent tracer. For example, as discussed with respect to FIG. 6, fluorescent tracer pump 110 may be stopped, terminating the introduction of fluorescent tracer into feed stream 114.

In general, the concentration of fluorescent tracer in feed stream 114 may be adjusted an amount effective to cause the second concentration of fluorescent tracer to be measurably different than the first concentration of fluorescent tracer, e.g., taking into account noise and other system fluctuations that may typically be present. For example, the second concentration may be at least 10% different (positive or negative) than the first concentration, such as at least 25% different, at least 50% different, or at least 100% different. When the concentration of fluorescent tracer is adjusted to reduce the concentration of fluorescent tracer relative to the first concentration, the concentration may be reduced until the second concentration ranges from 0.05 to 0.95 times the first concentration, such as from 0.1 to 0.9 times the first concentration, or from 0.1 to 0.5 times the first concentration. When the concentration of fluorescent tracer is adjusted to increase the concentration of fluorescent tracer relative to the first concentration, the concentration may be increased until the second concentration ranges from 1.1 to 10 times the first concentration, such as from 1.5 to 5 times the first concentration. Accordingly, in some applications, the concentration of fluorescent tracer may be adjusted until the second concentration of fluorescent tracer is at least an order of magnitude greater than the first concentration of fluorescent tracer, or less than an order of magnitude difference. The ratio by which controller 106 has increased or decreased the concentration of fluorescent tracer in feed stream 114 (e.g., the rate at which the fluorescent tracer is introduced into the feed stream) may be stored in memory 122 for subsequent use during a calibration procedure. It should be appreciated that the foregoing ranges of adjusted concentrations are examples and the disclosure is not necessarily limited in this effect.

After adjusting the concentration of fluorescent tracer, fluorometer 104 can fluorometrically analyze permeate stream 116 generated from the feed stream 114 in which the fluorescent tracer at the adjusted concentration level, e.g., in an amount effective to achieve the second concentration of fluorescent tracer in the feed stream. (308) As discussed with respect to step 304 in the example technique of FIG. 3, controller 106 executing instructions stored in memory 122 can control optical emitter 222 to direct light selected to be at an excitation wavelength for the fluorescent tracer introduced into feed stream 114 into the permeate fluid under analysis. Fluorescent tracer molecules within permeate under analysis may fluoresce at a wavelength different than the excitation wavelength in response to the energy emitted at the excitation wavelength. Optical detector 224 can detect the fluorescent emissions emitted by the tracer molecules present within the permeate. The magnitude of the fluorescent emissions detected by optical detector 224 may vary based on the concentration of the fluorescent tracer molecules present in the permeate under analysis.

Processor 120 of controller 106 can determine a second measured concentration of the fluorescent tracer in permeate stream 116 based on the fluorescent emissions detected by optical detector 224 and calibration curve data 232 stored in memory 122. For example, processor 120 of controller 106 may use one or more stored slope coefficients and a stored intercept of a calibration curve relating a magnitude of light detected by optical detector 224 (e.g., within one or more wavelengths corresponding to fluorescent emissions of the fluorescent tracer) to a measured concentration of the fluorescent tracer. The second measured concentration of fluorescent tracer determined by processor 120 can be stored in memory 122 for subsequent use during the calibration procedure.

In practice, changes to the concentration of fluorescent tracer introduced into feed stream 114 may take a period of time to show up in permeate stream 116. For example, when controller 106 controls fluorescent tracer pump 110 to change a dosing rate of fluorescent tracer into feed stream 114, an equilibrating period of time may need to elapse before a new equilibrium concentration is achieved in both the feed stream and permeate stream. Accordingly, controller 106 may control fluorometer 104 to determine the second measured concentration of tracer in the permeate stream a period of time after adjusting the concentration of the fluorescent tracer introduced into the feed stream effective to achieve equilibrium concentrations of the fluorescent tracer in the feed stream and in the permeate stream. Depending on the operational parameters of system 100, the period of time needed to achieve equilibrium may be greater than 15 minutes, such as greater than 30 minutes, or greater than 60 minutes. For example, the period of time needed to achieve equilibrium may range from 30 minutes to 120 minutes, such as from 60 minutes to 90 minutes.

Controller 106 may control fluorometer 104 to continuously fluorometrically analyze permeate stream 116, e.g., as frequently as the sampling frequency of the fluorometer will allow. When so configured, controller 106 may receive fluorometric data corresponding to feed stream 114 having the first concentration of fluorescent tracer, the second concentration of fluorescent tracer, and intermediate concentrations of fluorescent tracer as the system is undergoing equilibration. Controller 106 may or may not omit use of the fluorometric data generated from permeate stream 116 when the concentration of fluorescent tracer in the stream is not at an equilibrium level during the recalibration process. In other configurations, controller 106 may control fluorometer 104 to intermittently fluorometrically analyze permeate stream 116 rather than continuously analyze the stream.

Figure 4:
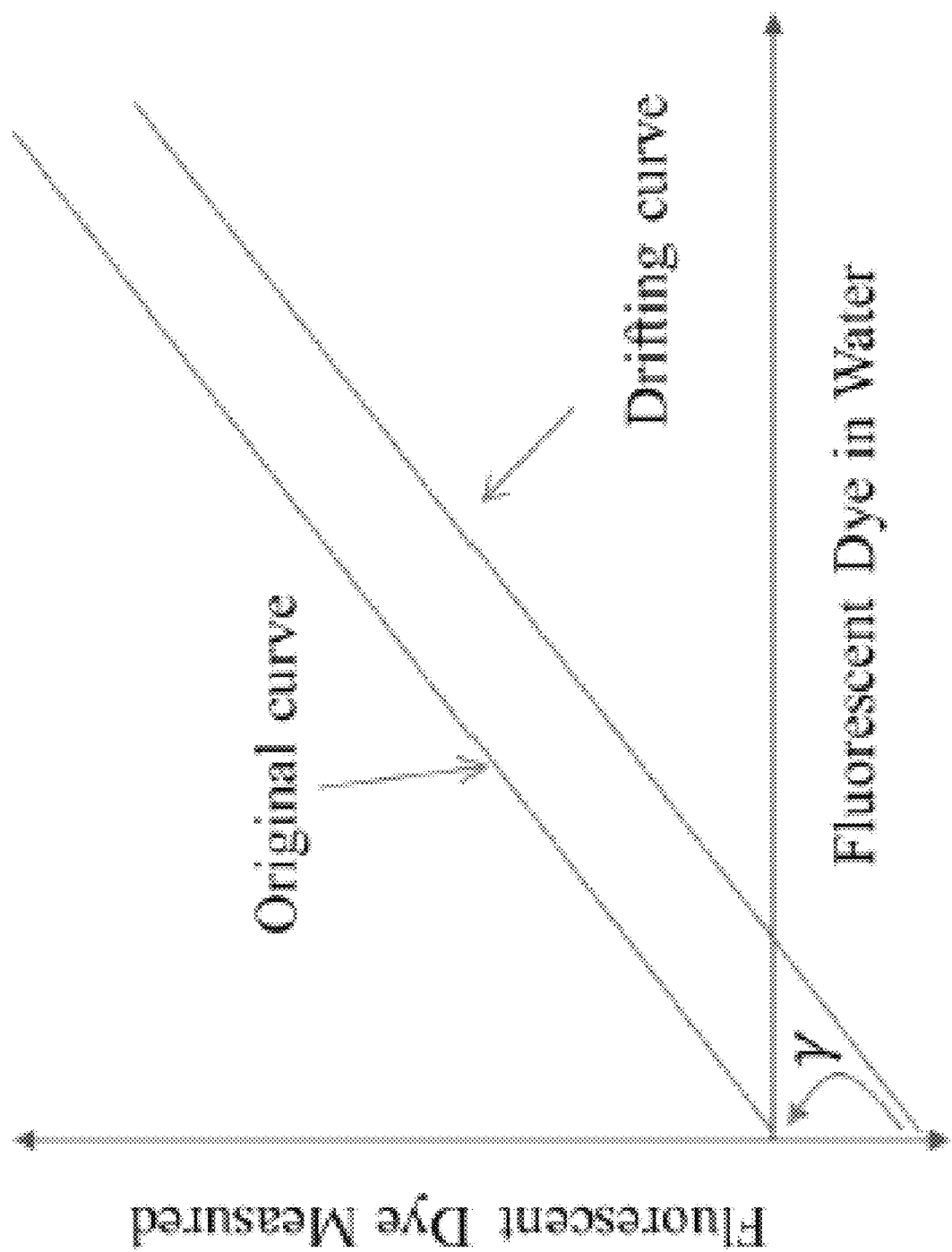
FIG. 4 is a graph illustrating an example intercept shift γ for an example calibration curve showing how the calibration curve may drift over time from its original position due to changing conditions.

To recalibrate fluorometer 104, controller 106 may determine an intercept shift for the calibration curve stored as calibration curve data 232 based on first and second measured concentrations of fluorescent tracer made by fluorometer 104 and, e.g., the ratio by which the concentration of fluorescent tracer was adjusted. (310) The intercept shift may be an error that has developed in the calibration information, e.g., such that the measured fluorescent tracer concentration determined by controller 106 is offset or deviated from the true concentration of fluorescent tracer actually present in the permeate stream. FIG. 4 is a graph illustrating an example intercept shift γ for an example calibration curve showing how the calibration curve may drift over time from its original position due to changing conditions. In this example, the intercept shift is shown as a negative, or downward shift, although the intercept shift may be positive or an upward shift.

Figure 5:
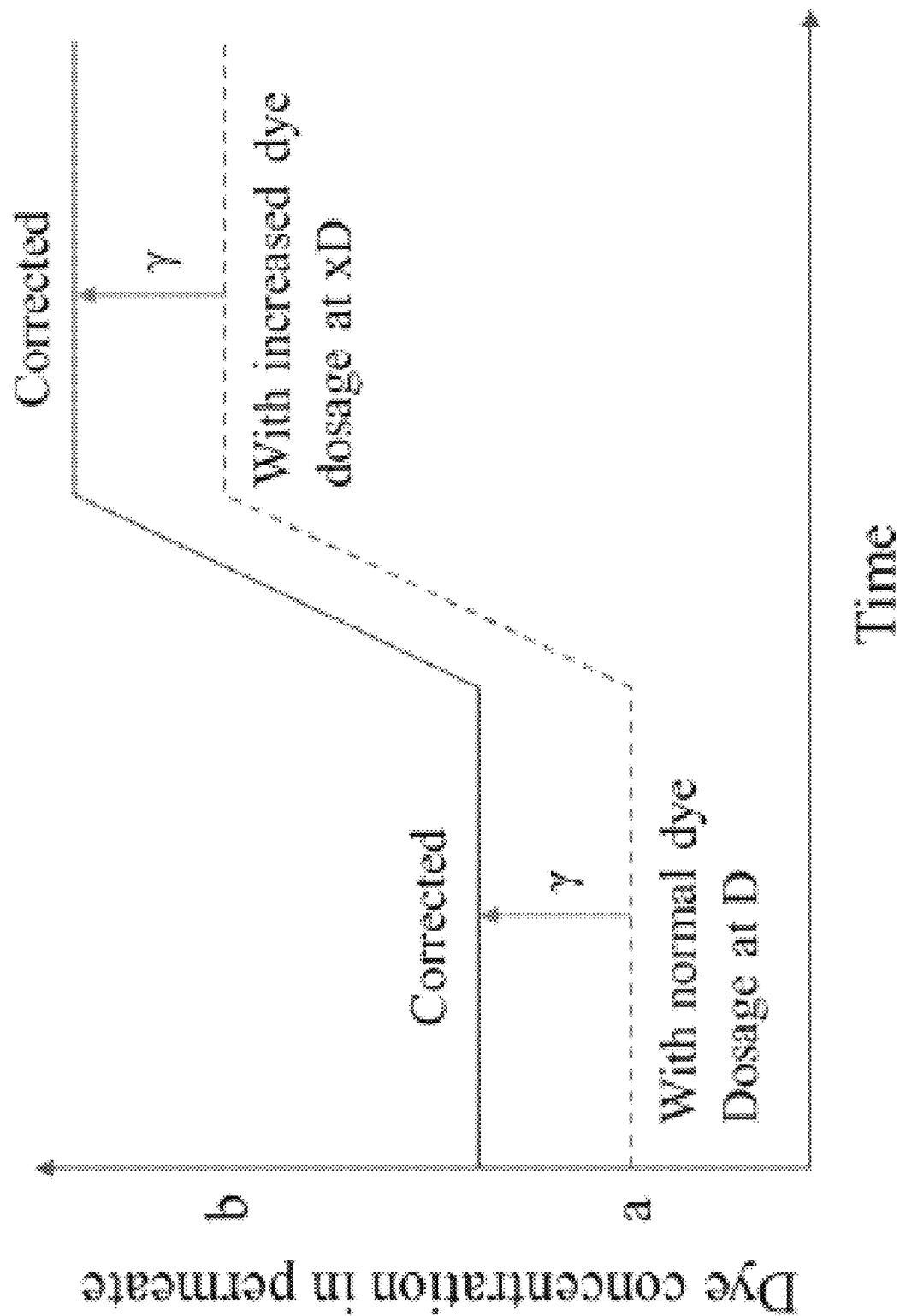
FIG. 5 is a graph illustrating an example intercept shift γ for an example calibration curve showing how measured fluorescent tracer concentration data can be used along with information concerning the extent to which a concentration of the fluorescent tracer dye has been adjusted to perform recalibration.

To determine the extent to which the intercept of the calibration curve stored in calibration curve data 232 has shifted, controller 106 may compare the first measured concentration of fluorescent tracer in permeate stream 116 to the second measured concentration of fluorescent tracer in the permeate stream. (310) FIG. 5 is a graph illustrating an example intercept shift γ for an example calibration curve showing how measured fluorescent tracer concentration data can be used along with information concerning the extent to which the concentration of fluorescent tracer dye has been adjusted. In this example, the concentration of fluorescent tracer in feed stream 114 is adjusted (increased in the illustrated example) from a first concentration D to a second concentration xD. In other words, the concentration is adjusted by a factor "x." This is expected to cause the concentration of fluorescent tracer in permeate stream 116 to change from a first concentration "a" to a second concentration "b". Since the rejection efficiency of the fluorescent tracer by membrane 102 is expected to be constant over the range of fluorescent tracer used and during the time span of recalibration (e.g., less than 1 ppm difference), the ratio of the second concentration of fluorescent tracer in the permeate stream "b" divided by the first concentration of the fluorescent tracer in the permeate stream "a" should be "x" if there is no intercept shift. However, where the ratio of "b" divided by "a" is different than "x," the difference can be considered an intercept shift.

Accordingly, in some examples, controller 106 may determine an intercept shift with reference to memory 122 using the following equation:

$$\gamma = \frac{b - ax}{x - 1} \qquad \text{Equation 2}$$

In Equation 2 above, γ is the intercept shift, a is the first measured concentration of the fluorescent tracer, b is the second measured concentration of the fluorescent tracer, and x is the second concentration of fluorescent tracer divided by the first concentration of fluorescent tracer. Controller 106 may store the determined intercept shift in memory 122 and/or use the determined intercept shift to establish a new intercept for a recalibrated calibration curve stored as calibration curve data 232.

In the example of FIG. 3, controller 106 determines an adjusted intercept for the calibration curve based on the determined intercept shift (312). In some examples, controller 106 references calibration curve data 232 stored in memory 122 and increments or decrements the stored calibration curve intercept by an amount corresponding to the intercept shift. For example, controller 106 may add the intercept shift determined in step 310 to the stored calibration curve intercept, thereby establishing an adjusted intercept. Controller 106 may store the adjusted intercept as calibration curve data 232 for use in subsequent fluorometric measurements, e.g., replacing the intercept previously stored.

As previously noted, the calibration curve stored as calibration curve data 232 may include one or more slope constants in addition to an intercept value. In performing the recalibration technique of FIG. 3, the intercept value for the calibration curve may be adjusted without changing the one or more slope constants stored. That is, the one or more slope constants generated during a full, multipoint calibration process may remain in calibration curve data 232 and be used during subsequent fluorometric measurements with only the intercept parameter changing due to recalibration. Accordingly, during partial recalibration, and adjusted intercept parameter for calibration curve data 232 may be determined without determining an adjusted slope parameter.

Figure 6:
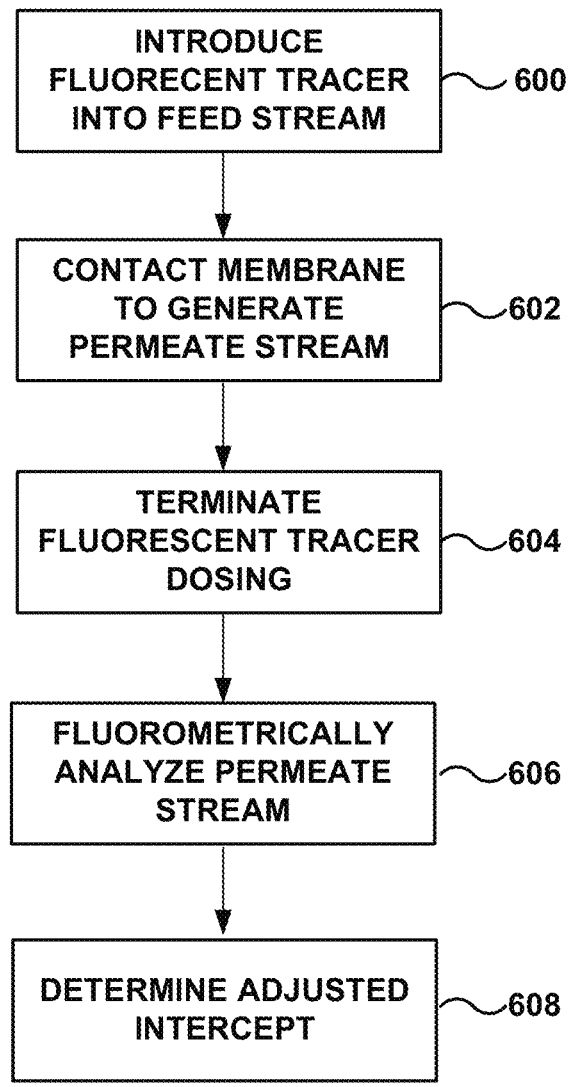
FIG. 6 is a flow diagram illustrating another example process by which the fluorometer of FIGS. 1 and 2 can be recalibrated.

FIG. 6 is another example technique for recalibrating fluorometer 104. As with the technique of FIG. 3, the technique of FIG. 6 is described with reference to system 100 in FIG. 1 and fluorometer 104 in FIG. 2, although can be performed in other systems and with other fluorometer configurations, e.g., as described herein.

With reference to FIG. 6, the technique includes introducing a fluorescent tracer into feed stream 114 to provide a first concentration of fluorescent tracer in the feed stream. (600) Operating under the control of controller 106 in system 100, fluorescent tracer pump 110 may be controlled to introduce fluorescent tracer into feed stream 114 from fluorescent tracer source 113. The amount of fluorescent tracer introduced into feed stream 114 may be effective to provide a concentration of fluorescent tracer in feed stream 114 within any of the concentration ranges discussed herein, or even concentration ranges outside of those discussed herein in suitable applications. The fluorescent tracer may be introduced into feed stream 114 as part of an ongoing monitoring process to evaluate the rejection efficiency of membrane 102.

Feed stream 114 contacts membrane 102, separating the feed stream into permeate stream 116 and concentrate stream 118. (602) Membrane 102 may be configured as a cross flow membrane, dead-end flow membrane, or have yet other configuration. In one example, system 100 is a reverse osmosis system. Feed stream pressure pump 108 can pressurize a source of liquid to be purified, overcoming the osmotic pressure of membrane 102 to drive the reverse osmosis process and generate the permeate stream 116.

In the technique of FIG. 6, controller 106 controls fluorescent tracer pump 110 to terminate the introduction of fluorescent tracer into feed stream 114. (604) After terminating the introduction of fluorescent tracer, fluorometer 104 can fluorometrically analyze permeate stream 116 generated from the feed stream 114 following termination of the introduction of fluorescent tracer. (606) As discussed with respect to FIG. 3, controller 106 executing instructions stored in memory 122 can control optical emitter 222 to direct light selected to be at an excitation wavelength for the fluorescent tracer introduced into feed stream 114 into the permeate fluid under analysis. Fluorescent tracer molecules within permeate under analysis may fluoresce at a wavelength different than the excitation wavelength in response to the energy emitted at the excitation wavelength. Optical detector 224 can detect the fluorescent emissions emitted by the tracer molecules present within the permeate. The magnitude of the fluorescent emissions detected by optical detector 224 may vary based on the concentration of the fluorescent tracer molecules present in the permeate under analysis.

Processor 120 of controller 106 can determine a measured concentration of the fluorescent tracer in permeate stream 116 based on the fluorescent emissions detected by optical detector 224 and calibration curve data 232 stored in memory 122. As discussed above with respect to FIG. 3, controller 106 may control fluorometer 104 to determine the measured concentration of tracer in the permeate stream a period of time after terminating the introduction of fluorescent tracer into the feed stream effective to achieve equilibrium conditions in the feed stream and in the permeate stream. Equilibrium conditions may occur when the feed stream and permeate stream are devoid of any added fluorescent tracer molecules. Accordingly, when controller 106 determines a "measured concentration" of fluorescent tracer in permeate stream 116—and, in fact, no fluorescent tracer is present—the "measured concentration" may represent a calibration error or offset for calibration curve data 232 in memory 122.

To recalibrate fluorometer 104, controller 106 may use the "measured concentration" of fluorescent tracer that is measured in the absence of any added fluorescent tracer being present in permeate stream as an intercept shift. For example, controller 106 may store and/or use the magnitude of fluorescent tracer measured in the absence of any added fluorescent tracer being present in permeate stream as an intercept shift.

Controller 106 can determine an adjusted intercept using the intercept shift. (608). For example, controller 106 may reference calibration curve data 232 stored in memory 122 and increment or decrement the stored calibration curve intercept by an amount corresponding to the intercept shift. For example, if the magnitude of fluorescent tracer measured in the absence of any added fluorescent tracer being present in permeate stream is negative, controller may add to the stored calibration curve intercept an amount effective to adjust the measured concentration to zero, thereby establishing an adjusted intercept. Likewise, if the magnitude of fluorescent tracer measured in the absence of any added fluorescent tracer being present in permeate stream is positive, controller may subtract from the stored calibration curve intercept an amount effective to adjust the measured concentration to zero, thereby establishing an adjusted intercept. Thus, controller 106 may determine a difference between the measured or reported concentration of the fluorescent tracer by fluorometer 104 in the permeate stream and the intercept to determine an amount by which the stored intercept should be shifted. In either case, controller 106 may store the adjusted intercept as calibration curve data 232 for use in subsequent fluorometric measurements, e.g., replacing the intercept previously stored.

The calibration curve stored as calibration curve data 232 may include one or more slope constants in addition to an intercept value. In performing the recalibration technique of FIG. 6, the intercept value for the calibration curve may be adjusted without changing the one or more slope constants stored. That is, the one or more slope constants generated during a full, multipoint calibration process may remain in calibration curve data 232 and be used during subsequent fluorometric measurements with only the intercept parameter changing due to recalibration. Accordingly, during partial recalibration, and adjusted intercept parameter for calibration curve data 232 may be determined without determining an adjusted slope parameter.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following examples may provide additional details about membrane separation systems and fluorometer calibration techniques according to the disclosure.

Example 1: Effect of Fluorescent Tracer Concentration on Membrane Rejection Efficiency An experiment was conducted to determine the effect, if any, changing the concentration of fluorescent tracer introduced into a membrane separation system has on the measured rejection efficiency of the membrane. One 2.5" spiral wound membrane element (DOW FILMTEC BW30-2540) was used to filter NaCl solution (1,500 mg/L) with various fluorescent tracer concentrations. All concentrate from the membrane system was recycled back to a feed tank. Water temperature was controlled at 25 degrees Celsius by circulating cooling water through a coil immersed in the feed tank. Feed pressure was set at 12 bar or 174 psi. Feed and permeate fluorescence were monitored continuously by directing feed and permeate sample through feed and fluorometers, respectively. After adding a small amount of fluorescent tracer into the feed tank, rejection efficiency was estimated based on feed and permeate fluorescence. Then, additional fluorescent tracer was added and rejection efficiency was measured after fluorescence readings became stable, and so on.

Figure 7:
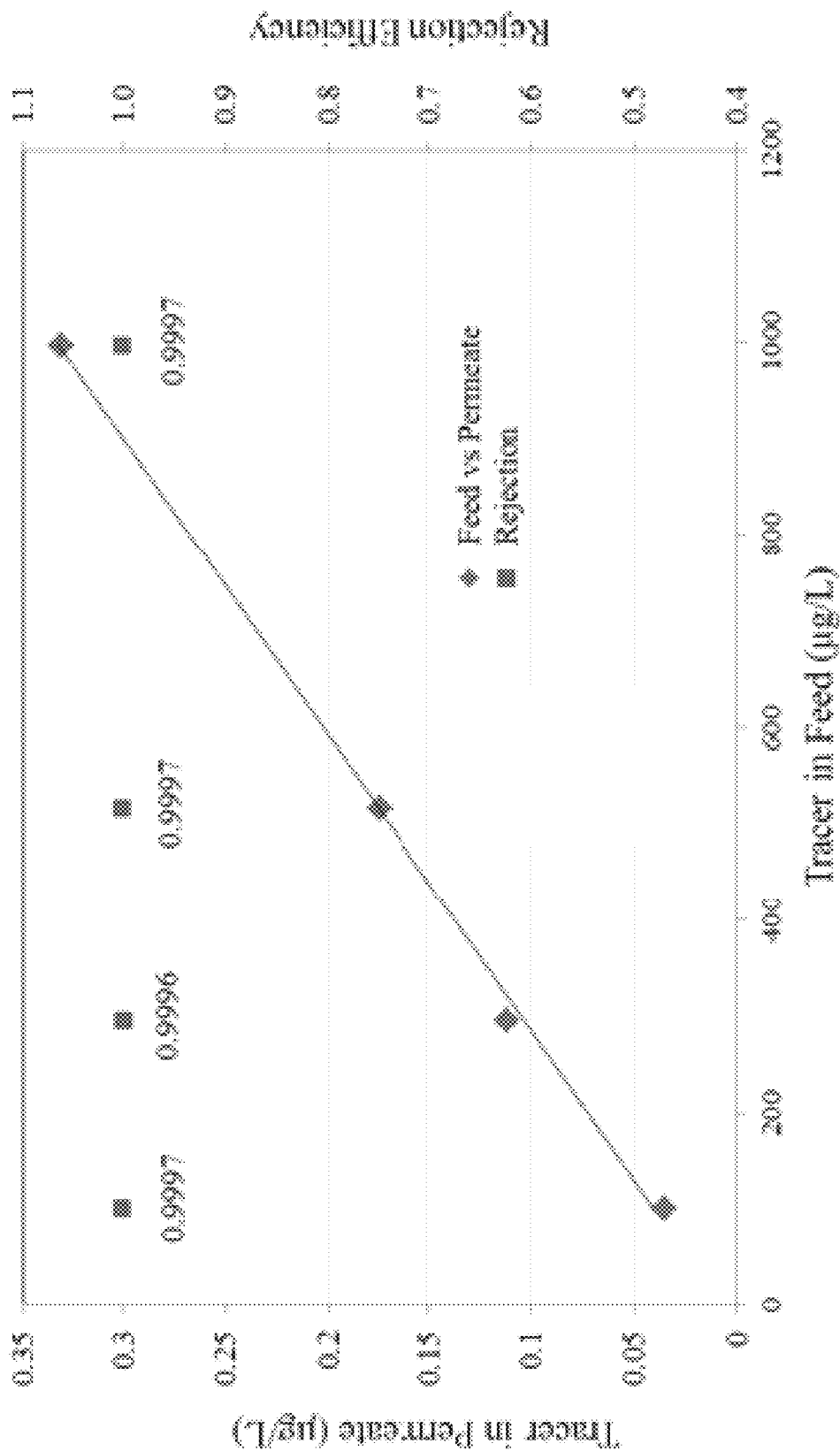
FIG. 7 is a plot of experimental data showing fluorescent tracer concentration in an example feed stream versus permeate stream along with measured membrane rejection efficiency.

The results of the experiment are shown in FIG. 7, which is a plot of fluorescent tracer concentration in the feed stream versus fluorescent tracer concentration in the permeate and membrane rejection efficiency. As shown, the membrane rejection efficiency was nearly constant regardless of fluorescent tracer concentration in the feed stream.

Example 2: Calibration Curve Intercept Adjustment

Using the same experimental system described in Example 1 above, an experiment was conducted to evaluate an example calibration curve intercept adjustment according to the present disclosure. A feed fluorometer was calibrated for a fluorescent tracer range between 0 and 400 µg/L and an ultralow range permeate fluorometer was calibrated for a fluorescent tracer range between 0 and 1 µg/L. The fluorometers were calibrated using multi-point calibration solutions, including a zero point calibration solution devoid of fluorescent tracer and at least one calibration solution having a known concentration of fluorescent tracer. The intercept or zero point of the ultralow range fluorometer was deliberately moved by −0.02 µg/L (or −20 ng/L), thereby read −20 ng/L with DI water, artificially create a calibration error.

Figure 8:
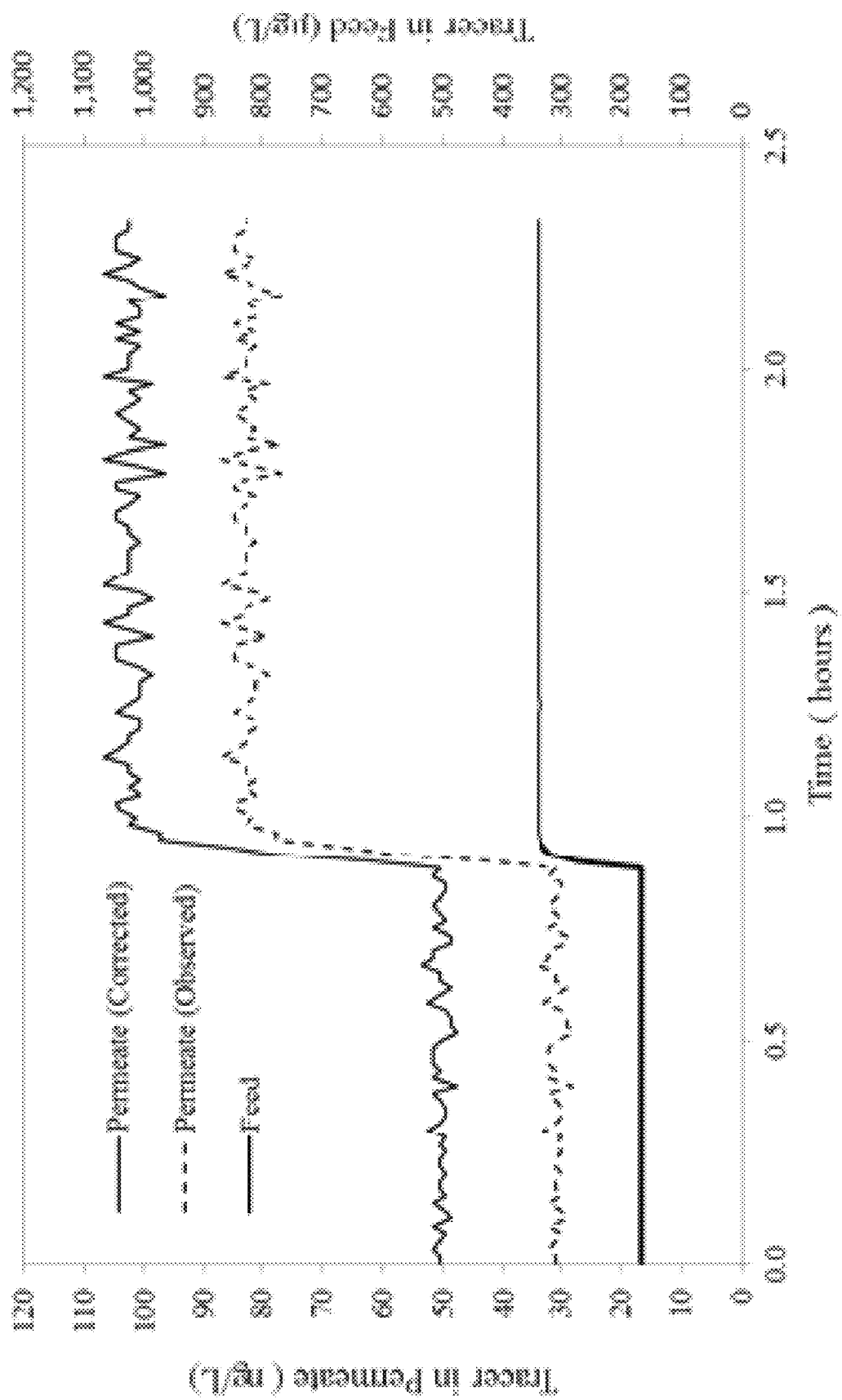
FIG. 8 is a plot of experimental data showing example fluorescent tracer concentration measurements made with a fluorometer before and after recalibration using an example recalibration technique according to the disclosure.

While filtering 1,500 mg/L NaCl solution using a DOW FILMTEC BW30 membrane, fluorescent tracer was added to the feed tank. After reaching a steady state, fluorescent tracer concentrations in the feed stream and permeate stream were measured at 167 µg/L and 31 ng/L, respectively, as shown in FIG. 8. If the intercept or zero point of the ultralow range permeate fluorometer was not moved by −20 ng/L, the fluorescent tracer concentration in the permeate would have measured at 51 ng/L. Additional fluorescent tracer was added to the feed tank to raise the tracer concentration by approximately 100%. After reaching a steady state, the fluorescent tracer concentrations in the feed stream and permeate stream were stabilized at approximately 339 µg/L and approximately 83 ng/L, respectively.

Using Equation 2 above, the intercept shift ($\gamma$) for the calibration curve data stored for the ultralow range fluorometer was calculated. The multiplication factor (x) of fluorescent tracer concentration in the feed was calculated at 2.03 (=339/167). The average fluorescent tracer concentrations in the permeate before and after raising the fluorescent tracer concentration in feed were 31 ng/L (a) and 83 ng/L (b), respectively. The intercept shift ($\gamma$) was calculated at +19.6 ng/L, which was sufficient (within +/−5%) to compensate most of the artificial zero point movement (−20 ng/L) made earlier in the study.

FIG. 8 is a plot illustrating the fluorescent tracer concentrations observed during the experiment in the feed stream and the permeate stream. FIG. 8 also illustrates a corrected fluorescent tracer concentration in the permeate, which was obtained by adding the 19.6 ng/L calculated correction factor to the intercept shift $\gamma$.

The invention claimed is:

1. A method of calibrating a fluorometer used to monitor a reverse osmosis membrane separation process comprising:
   introducing a fluorescent tracer into a feed stream to provide a first concentration of fluorescent tracer in the feed stream;
   contacting a membrane with the feed stream, thereby generating a permeate stream and a concentrate stream;

fluorometrically analyzing the permeate stream generated from the feed stream having the first concentration of fluorescent tracer with a fluorometer and determining therefrom a first measured concentration of the fluorescent tracer in the permeate stream based on a stored calibration curve that includes an intercept;

adjusting a concentration of the fluorescent tracer in the feed stream to provide a second concentration of fluorescent tracer in the feed stream different than the first concentration;

fluorometrically analyzing the permeate stream generated from the feed stream having the second concentration of fluorescent tracer with the fluorometer and determining therefrom a second measured concentration of the fluorescent tracer in the permeate stream based on the calibration curve;

determining an intercept shift for the calibration curve based on comparison of the first measured concentration to the second measured concentration; and determining an adjusted intercept for the calibration curve based on the intercept shift.

2. The method of claim 1, wherein adjusting the concentration of the fluorescent tracer comprises adjusting the concentration of the fluorescent tracer until the second concentration of the fluorescent tracer ranges from 0.1 to 0.9 times the first concentration of the fluorescent tracer or from 1.1 to 10 times the first concentration of the fluorescent tracer.

3. The method of claim 1, wherein determining the intercept shift for the calibration curve based on comparison of the first measured concentration to the second measured concentration comprises determining the intercept shift according to an equation:

$$\gamma = \frac{b - ax}{x - 1}$$

wherein $\gamma$ is the intercept shift, a is the first measured concentration of the fluorescent tracer, b is the second measured concentration of the fluorescent tracer, and x is the second concentration of fluorescent tracer divided by the first concentration of fluorescent tracer.

4. The method of claim 1, wherein:
determining the adjusted intercept for the calibration curve comprises adding the determined intercept shift to the intercept of the calibration curve; and
the calibration curve comprises one or more slope constants in addition to the intercept, and determining the adjusted intercept for the calibration curve comprises determining the adjusted intercept without determining adjusted slope constants.

5. The method of claim 1, further comprising storing the adjusted intercept in a non-transitory memory associated with the fluorometer.

6. The method of claim 1, wherein the calibration curve is a first order equation having a form y=m*x+b, where y is a measured concentration of the fluorescent tracer, m is a fluorometric signal measured by the fluorometer, x is the slope, and b is the intercept.

7. The method of claim 1, wherein the fluorometer is an online fluorometer that substantially continuously fluorometrically analyzes the permeate stream generated from the feed stream, and
further comprising, prior to installing the fluorometer online, performing a multi-point calibration with a fluorometer, the multi-point calibration comprising fluorometrically analyzing a first fluid devoid of the fluorescent tracer and a second fluid having a known concentration of the fluorescent tracer and determining therefrom a slope and the intercept for the calibration curve,
wherein determining the adjusted intercept for the calibration curve comprises determining the adjusted intercept without determining an adjusted slope.

8. The method of claim 1, wherein:
the feed stream comprises an aqueous waste water stream; and
the membrane is a reverse osmosis membrane.

9. The method of claim 1, wherein fluorometrically analyzing the permeate stream generated from the feed stream having the second concentration of fluorescent tracer comprises fluorometrically analyzing the permeate stream a period of time after adjusting the concentration of the fluorescent tracer introduced into the feed stream effective to achieve equilibrium concentrations of the fluorescent tracer in the feed stream and in the permeate stream.

10. The method of claim 1, wherein the first concentration of fluorescent tracer in the feed stream ranges from 10 parts per billion (ppb) to 100,000 ppb, and the first measured concentration of the fluorescent tracer in the permeate stream is less than 10 ppb.

11. A system comprising:
a fluorescent tracer pump configured to introduce fluorescent tracer into a feed stream;
a membrane configured to separate the feed stream into a permeate stream and a concentrate stream;
a fluorometer configured and positioned to fluorometrically analyze the permeate stream; and
a controller communicatively coupled to the fluorescent tracer pump and the fluorometer, wherein the controller is configured to:
control the fluorescent tracer pump to introduce the fluorescent tracer into a feed stream to provide a first concentration of fluorescent tracer in the feed stream;
control the fluorometer to fluorometrically analyze the permeate stream generated from the feed stream having the first concentration of fluorescent tracer and determine therefrom a first measured concentration of the fluorescent tracer in the permeate stream based on a stored calibration curve that includes an intercept;
control the fluorescent tracer pump to adjust a concentration of the fluorescent tracer introduced into the feed stream to provide a second concentration of fluorescent tracer in the feed stream different than the first concentration;
control the fluorometer to fluorometrically analyze the permeate stream generated from the feed stream having the second concentration of fluorescent tracer and determine therefrom a second measured concentration of the fluorescent tracer in the permeate stream based on the calibration curve;
determine an intercept shift for the calibration curve based on comparison of the first measured concentration to the second measured concentration; and
determine an adjusted intercept for the calibration curve based on the intercept shift.

12. The system of claim 11, wherein the controller is configured to determine the intercept shift for the calibration curve based on comparison of the first measured concentration to the second measured concentration comprises determining the intercept shift according to an equation:

$$\gamma = \frac{b-ax}{x-1}$$

wherein γ is the intercept shift, a is the first measured concentration of the fluorescent tracer, b is the second measured concentration of the fluorescent tracer, and x is the second concentration of fluorescent tracer divided by the first concentration of fluorescent tracer.

13. The system of claim 11, wherein the controller is configured to determine the adjusted intercept for the calibration curve by adding the determined intercept shift to the intercept of the calibration curve and further store the adjusted intercept in a non-transitory memory.

14. A method of calibrating a fluorometer used to monitor a reverse osmosis membrane separation process comprising:
   introducing a fluorescent tracer into a feed stream;
   contacting a membrane with the feed stream, thereby generating a permeate stream and a concentrate stream;
   terminating the introduction of fluorescent tracer introduced into the feed stream;
   fluorometrically analyzing the permeate stream generated from the feed stream following termination of the fluorescent tracer and determining therefrom a measured concentration of the fluorescent tracer in the permeate stream based on a stored calibration curve that includes an intercept;
   determining an adjusted intercept for the calibration curve of the fluorometer by at least using the measured concentration of the fluorescent tracer as an intercept shift.

15. The method of claim 14, wherein determining the intercept shift for the calibration curve comprises determining a difference between the fluorometric response and the intercept for the stored calibration curve.

16. The method of claim 14, wherein determining the adjusted intercept for the calibration curve comprises determining a value for the adjusted intercept that provides a measured concentration of the fluorescent tracer in the permeate stream of zero when the fluorescent tracer is not being introduced into the feed stream.

17. The method of claim 14, further comprising storing the adjusted intercept in a non-transitory memory associated with the fluorometer.

18. The method of claim 14, wherein the calibration curve is a first order equation having a form y=m*x+b, where y is a measured concentration of the fluorescent tracer, m is a fluorometric signal measured by the fluorometer, x is the slope, and b is the intercept.

19. The method of claim 14, wherein the fluorometer is an online fluorometer that substantially continuously fluorometrically analyzes the permeate stream generated from the feed stream, and
   further comprising, prior to installing the fluorometer online, performing a multi-point calibration with a fluorometer, the multi-point calibration comprising fluorometrically analyzing a first fluid substantially devoid of the fluorescent tracer and a second fluid having a known concentration of a fluorescent tracer and determining therefrom the slope and intercept for the calibration curve,
   wherein determining the adjusted intercept for the calibration curve comprises determining the adjusted intercept without determining an adjusted slope.

20. The method of claim 14, wherein:
   the membrane is a reverse osmosis membrane; and
   the first concentration of fluorescent tracer in the feed stream ranges from 200 micrograms per liter to 1200 micrograms per liter, and
   the first measured concentration of the fluorescent tracer in the permeate stream is less than 1 micrograms per liter.

21. The method of claim 14, wherein fluorometrically analyzing the permeate stream generated from the feed stream following termination of the fluorescent tracer comprises fluorometrically analyzing the permeate stream a period of time after terminating the introduction of the fluorescent tracer effective to achieve equilibrium concentrations of the fluorescent tracer in the feed stream and in the permeate stream.

22. A system comprising:
   a fluorescent tracer pump configured to introduce fluorescent tracer into a feed stream;
   a reverse osmosis membrane configured to separate the feed stream into a permeate stream and a concentrate stream;
   a fluorometer configured and positioned to fluorometrically analyze the permeate stream; and
   a controller communicatively coupled to the fluorescent tracer pump and the fluorometer, wherein the controller is configured to:
      control the fluorescent tracer pump to introduce a fluorescent tracer into the feed stream;
      subsequently control the fluorescent tracer pump to terminate the introduction of fluorescent tracer introduced into the feed stream;
      control the fluorometer to fluorometrically analyze the permeate stream generated from the feed stream following termination of the fluorescent tracer and determine therefrom a measured concentration of the fluorescent tracer in the permeate stream based on a stored calibration curve that includes an intercept; and
      determine an adjusted intercept for the calibration curve of the fluorometer by at least using the measured concentration of the fluorescent tracer as an intercept shift.

23. The system of claim 22, wherein the controller is configured to determine the adjusted intercept for the calibration curve by at least determining a difference between the fluorometric response and the intercept for the stored calibration curve.

24. The system of claim 22, wherein the controller is configured to determine the adjusted intercept for the calibration curve by at least determining a value for the adjusted intercept that provides a measured concentration of the fluorescent tracer in the permeate stream of zero when the fluorescent tracer is not being introduced into the feed stream.

25. The system of claim 22, wherein the calibration curve comprises one or more slope constants in addition to the intercept, and the controller is configured to determine the adjusted intercept for the calibration curve without determining adjusted slope constants.

26. A method for calibrating a fluorometer comprising:
   performing a multi-point calibration with a fluorometer, the multi-point calibration comprising fluorometrically analyzing a first fluid substantially devoid of a fluorescent tracer and a second fluid having a known concentration of the fluorescent tracer and determining therefrom a calibration curve for the fluorometer that includes a slope and an intercept;

subsequent to performing the multi-point calibration, fluorometrically analyzing, with the fluorometer, an aqueous stream in which the fluorescent tracer is introduced at a first concentration level and determining a measured concentration of the fluorescent tracer in the aqueous stream based on the calibration curve;

adjusting the concentration of fluorescent tracer introduced into the aqueous stream by one of terminating an addition of the fluorescent tracer to the aqueous stream, increasing an amount of the fluorescent tracer added to the aqueous stream, or decreasing the amount of the fluorescent tracer added to the aqueous stream;

fluorometrically analyzing, with the fluorometer, the aqueous stream following adjustment of the concentration of fluorescent tracer;

determining an intercept shift for the calibration curve based on fluorometric analysis of the aqueous stream following adjustment of the concentration of fluorescent tracer without determining an adjusted slope for the calibration curve; and storing an adjusted intercept for the calibration curve compensating for the intercept shift in a non-transitory memory associated with the fluorometer.

27. The method of claim 26, wherein adjusting the concentration of the fluorescent tracer introduced into the aqueous stream comprises one of increasing the concentration of the fluorescent tracer by at least an order of magnitude and terminating the introduction of the fluorescent tracer into the aqueous stream.

* * * * *